(12) United States Patent
Fani et al.

(10) Patent No.: US 12,067,625 B2
(45) Date of Patent: Aug. 20, 2024

(54) SYSTEM AND METHOD FOR PROTECTION PLANS AND WARRANTY DATA ANALYTICS

(71) Applicant: World Wide Warranty Life Services Inc., Port Moody (CA)

(72) Inventors: Hossein Fani, Toronto (CA); Fattane Zarrinkalam, Toronto (CA); Ebrahim Bagheri, Toronto (CA); Richard Hui, Coquitlam (CA)

(73) Assignee: World Wide Warranty Life Services Inc., Port Moody (CA)

( * ) Notice: Subject to any disclaimer, the term of this patent is extended or adjusted under 35 U.S.C. 154(b) by 737 days.

(21) Appl. No.: 15/734,135

(22) PCT Filed: Jun. 3, 2019

(86) PCT No.: PCT/CA2019/050767
§ 371 (c)(1),
(2) Date: Dec. 1, 2020

(87) PCT Pub. No.: WO2019/227238
PCT Pub. Date: Dec. 5, 2019

(65) Prior Publication Data
US 2021/0217093 A1    Jul. 15, 2021

Related U.S. Application Data

(60) Provisional application No. 62/679,099, filed on Jun. 1, 2018.

(51) Int. Cl.
*G06Q 40/08* (2012.01)
*G06F 16/23* (2019.01)
(Continued)

(52) U.S. Cl.
CPC ......... *G06Q 40/08* (2013.01); *G06F 16/2379* (2019.01); *G06F 16/245* (2019.01);
(Continued)

(58) Field of Classification Search
CPC .. G06Q 40/08; G06Q 30/012; G06Q 10/0635; G06Q 10/20; G06F 16/2379;
(Continued)

(56) References Cited

U.S. PATENT DOCUMENTS

| | | |
|---|---|---|
| 7,191,089 B2 | 3/2007 | Clifford et al. |
| 7,904,319 B1 | 3/2011 | Whear et al. |

(Continued)

FOREIGN PATENT DOCUMENTS

| | | |
|---|---|---|
| CN | 103380430 A | 10/2013 |
| CN | 106663281 A | 5/2017 |

(Continued)

OTHER PUBLICATIONS

Händel, Peter, et al. "Smartphone-based measurement systems for road vehicle traffic monitoring and usage-based insurance." IEEE systems journal 8.4 (2013): 1238-1248. (Year: 2013).*

(Continued)

*Primary Examiner* — John S. Wasaff
(74) *Attorney, Agent, or Firm* — BERESKIN & PARR LLP/S.E.N.C.R.L. s.r.l; Tonino Rosario Orsi

(57) ABSTRACT

Different examples for a server and methods for providing actionable insights based on warranty analytics related to usage of a protective apparatus with an electronic device by a customer are described herein. In some cases, the method comprises: receiving an electronic query, at a server, from a user device; accessing, at the server, at least one of risk profile data and test data from a multidimensional data structure, where the at least one risk profile data and test data include data needed to respond to the electronic query; determining, at the server, a response to the electronic query using the accessed data; an sending an electronic message from the server to the user device, the electronic message including data for answering the electronic query.

27 Claims, 12 Drawing Sheets

(51) Int. Cl.
*G06F 16/245* (2019.01)
*G06F 16/25* (2019.01)
*G06N 20/00* (2019.01)
*G06Q 30/012* (2023.01)

(52) U.S. Cl.
CPC ......... *G06F 16/254* (2019.01); *G06Q 30/012* (2013.01); *G06N 20/00* (2019.01)

(58) Field of Classification Search
CPC ..... G06F 16/245; G06F 16/254; G06N 20/00; G06N 7/01
USPC ........................................................ 705/302
See application file for complete search history.

(56) References Cited

U.S. PATENT DOCUMENTS

| | | | |
|---|---|---|---|
| 9,947,020 | B2 | 4/2018 | Fordyce, III et al. |
| 10,127,647 | B2 | 11/2018 | Forutanpour et al. |
| 10,269,110 | B2 | 4/2019 | Forutanpour et al. |
| 2006/0116848 | A1* | 6/2006 | Clifford ............... G01P 15/18 |
| 2009/0216579 | A1 | 8/2009 | Zen et al. |
| 2011/0261049 | A1* | 10/2011 | Cardno ............... G06Q 40/04 345/419 |
| 2014/0081652 | A1 | 3/2014 | Klindworth |
| 2014/0150100 | A1* | 5/2014 | Gupta ................ H04L 63/1425 726/22 |
| 2014/0244352 | A1* | 8/2014 | Fordyce, III ....... G06Q 30/0226 705/7.29 |
| 2015/0007115 | A1* | 1/2015 | Kleser ................ G06F 16/2264 715/854 |
| 2015/0317337 | A1 | 11/2015 | Edgar |
| 2016/0054354 | A1* | 2/2016 | Keal .................. G01P 15/18 702/141 |
| 2016/0055589 | A1* | 2/2016 | Billings ............... G06Q 40/08 705/4 |
| 2016/0125548 | A1* | 5/2016 | Bowles ............... G06Q 30/0237 705/4 |
| 2016/0253498 | A1* | 9/2016 | Valencia ............. G06N 20/00 726/23 |
| 2017/0006135 | A1* | 1/2017 | Siebel ................ G06Q 10/06 |
| 2017/0124483 | A1* | 5/2017 | Huang ................ G06N 20/10 |
| 2017/0301078 | A1* | 10/2017 | Forutanpour ......... G06T 7/0004 |
| 2018/0068392 | A1 | 3/2018 | Bowes et al. |
| 2018/0075147 | A1 | 3/2018 | Bagheri et al. |
| 2018/0355638 | A1 | 12/2018 | Harring et al. |
| 2019/0213605 | A1* | 7/2019 | Patel .................. G07C 5/0808 |
| 2020/0020091 | A1* | 1/2020 | Forutanpour ........... G06F 18/22 |

FOREIGN PATENT DOCUMENTS

| | | | |
|---|---|---|---|
| CN | 106875270 | A | 6/2017 |
| EP | 0267579 | B1 | 8/2013 |
| EP | 2267579 | B1 | 8/2013 |
| WO | 2009140592 | A1 | 11/2009 |
| WO | 2015187372 | A1 | 12/2015 |
| WO | 2018044969 | A1 | 3/2018 |
| WO | 2018055589 | A1 | 3/2018 |

OTHER PUBLICATIONS

Wiggers, K. (2017, May 22). The best smartphone extended warranty plans: Compared. Digital Trends. https://www.digitaltrends.com/mobile/smartphone-warranty-programs-compared/ (Year: 2017).*

International Search Report and Written Opinion mailed Aug. 22, 2019 in International Patent Application No. PCT/CA200/050767 (9 pages).

Appsee website, Wayback Machine May 13, 2018 screen capture <https://web.archive.org/web/20180513062334/https://www.appsee.com> (8 pages).

Fani et al., "Temporally Like-minded User Community Identification through Neural Embeddings", Proceedings of the 2017 ACM on Conference on Information and Knowledge Management, pp. 577-586.

Wikipedia webpage on the Gaussian Mixture Model, Wayback Machine May 26, 2018 screen capture <https://web.archive.org/web/20180526235354/https://en.wikipedia.org/wiki/Mixture_model> (13 pages).

Forgy, "Cluster Analysis of Multivariate Data: Efficiency vs. Interpretability of Classifications", Biometrics, 1965, 21: 768-780. (Abstract, pp. 768-769).

Blondel et al., "Fast unfolding of communities in large networks", Journal of Statistical Mechanics: Theory and Experiment, Oct. 9, 2008, 2008: 1-12.

Grander, "Investigating Causal Relations by Econometric Models and Cross-Spectral Methods", Econometrica, Aug. 1969, 37(3): 424-438.

Fani et al., "Finding Diachronic Like-Minded Users", Computational Intelligence, Apr. 28, 2017, 34(1): 124-144.

Fu "A Recommendation System Using OLAP Approach", 2016 IEEE/WIC/ACM International Conference on Web Intelligence (WI), IEEE, Oct. 13, 2016 (Oct. 13, 2016), pp. 622-625, XP033043008, DOI: 10.11091W1.2016.010.

Xi Lianxia "Surveying, Mapping and Spatial Geographic Information", (2013) S1Expect SuperMap GIS in Applied Research in the Insurance Industry, vol. 36 (3 pages).

* cited by examiner

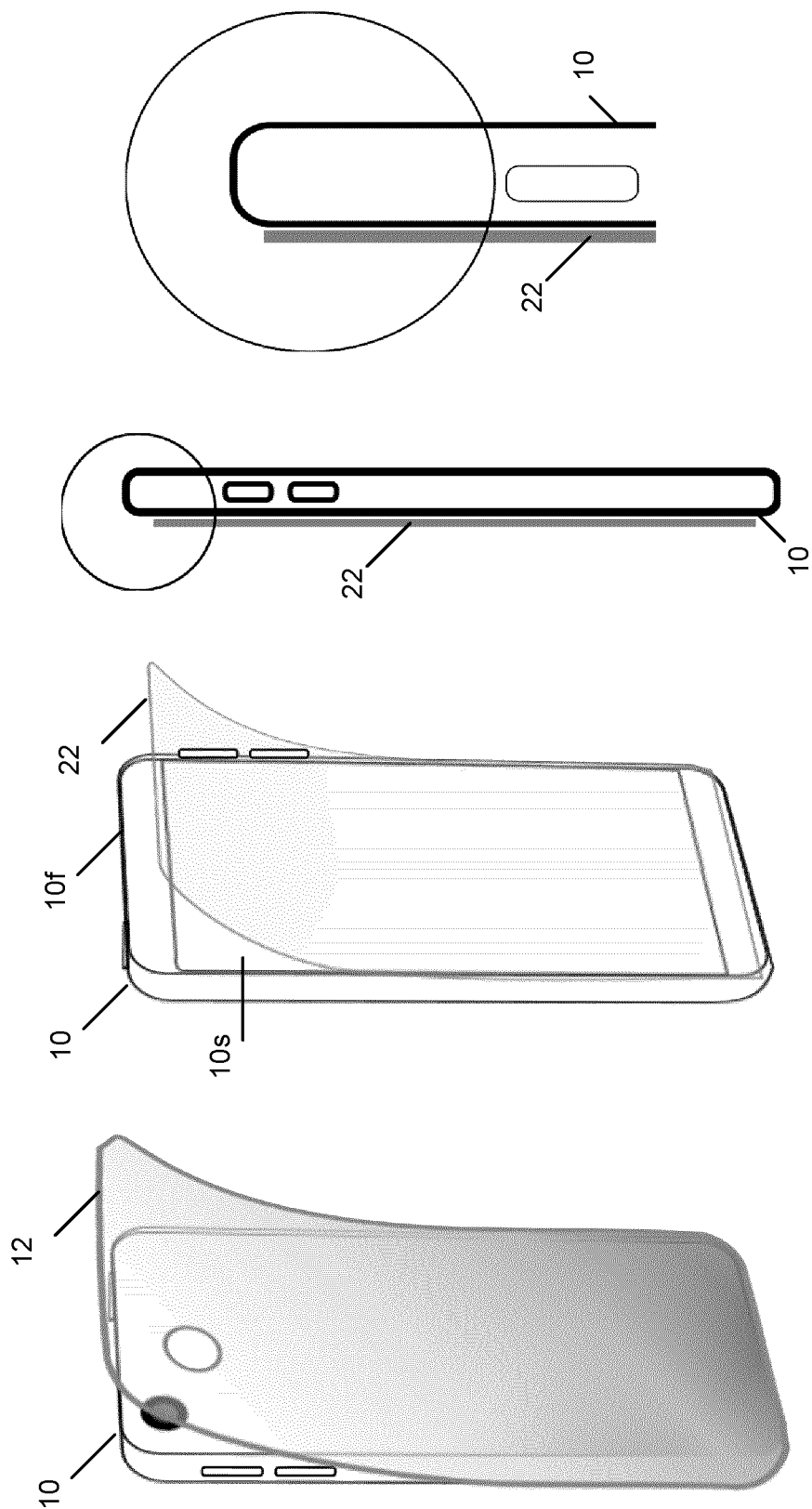

SYSTEM AND METHOD FOR PROTECTION PLANS AND WARRANTY DATA ANALYTICS

CROSS-REFERENCE TO RELATED APPLICATION

This application is a 35 USC § 371 national stage entry of International Patent Application No. PCT/CA2019/050767 filed Jun. 3, 2019, which claims the benefit of U.S. Provisional Patent Application No. 62/679,099 filed Jun. 1, 2018; the entire contents of each of which are hereby incorporated herein in their entirety.

FIELD

At least one embodiment is described herein that generally relates to electronic data processing, and in particular, to the processing of electronic data including data warehouse, data marts, OLAP data cubes, using various techniques including artificial intelligence (e.g. data mining/machine learning) oriented methods that can be used for performing various actions including determining and providing protection plans and warranty information for use of portable electronic devices.

BACKGROUND

Portable electronic devices such as cellular phones, smart phones, a variety of portable personal computing devices, e.g., personal digital assistants (PDA), electronic book readers, video game consoles, and the like have become ubiquitous globally. Due to their portability, protective apparatuses like protective cases and screen protectors, just to name a few, have become prevalent as well in order to provide the portable electronic device with protection against physical damage (e.g., from hits, scratches, drops, etc.).

Referring to FIG. 1, a widely used, yet inexpensive solution to protect an electronic device 10 against damage is to use a protective cover, also commonly referred to as a protective case 12. These protective cases may be manufactured with different sizes and a variety of different materials (e.g., silicone, leather, plastics, gels, etc.), which may be substantially rigid or at least partially deformable (e.g., flexible and/or stretchable). These protective cases are not a permanent addition to the electronic device and can be detached.

While the protective cases provide protection to the rear, edges and corners of the electronic device, protective cases often fall short when it comes to protecting the electronic device's front portion which includes the display screen. Referring now to FIGS. 2A-2C, a screen protector 22 is an additional sheet of material, commonly made of either plastic using nanotechnology, e.g., polyethylene terephthalate (PET) and thermoplastic polyurethane (TPU), tempered glass or liquid glass (silicon-based coating), that can be attached to the front 10f of an electronic device 10 to provide protection to a screen 10s of the electronic device 10 against physical damage (e.g., scratches).

Protective apparatus manufacturers, either in collaboration with warrantors or individually, certify their products by providing warranty coverage to the electronic device on which at least one protective apparatus (e.g., protective case and/or screen protector) is applied. For instance, in the case of damage to the electronic device due to a free fall (i.e. the electronic device is dropped) or incidental contact (i.e. the electronic device is hit), the customer is promised a full or partial award for the remedy of damages if one or more protective apparatuses were applied to the electronic device at the time that the damage occurred.

To benefit both the warranty service provider and the customer (i.e., the electronic device owner/user), warranty insurance policies (e.g., limited or lifetime warranty) and pricing may vary based on the expected lifetime cost of an issued policy for a particular customer, electronic device and protective apparatus. Otherwise, if a uniform policy and price is used for all customers then this results in low risk customers being overcharged, while high risk customers are undercharged. The market response then will be that the population of high risk customers will increase because they are undercharged and the population of low risk customers will decrease because they are overcharged. In order to remain competitive, a warranty service provider may try to readjust the policy and price of warranties to address undercharged high risk and overcharged low risk customers. However, properly tailoring and offering such policies to each customer is difficult since various factors must be determined and properly analyzed and currently there are no known techniques.

SUMMARY OF VARIOUS EMBODIMENTS

In one broad aspect, in accordance with the teachings herein provided a computer implemented method for providing actionable insights based on warranty analytics related to usage of a protective apparatus with an electronic device by a customer, wherein the method comprises: receiving an electronic query, at a server, from a user device; accessing, at the server, at least one of risk profile data and test data from a multidimensional data structure, where the at least one risk profile data and test data include data needed to respond to the electronic query; determining, at the server, a response to the electronic query using the accessed data; and sending an electronic message from the server to the user device, the electronic message including data for answering the electronic query.

In at least one embodiment, the method comprises retrieving at least one of customer risk profile data, customer cluster data, electronic claims distribution data, protective apparatus risk profile data, electronic risk profile data, and software app risk profile data for the at least one risk profile data.

In at least one embodiment, the method comprises retrieving at least one of electronic device usability test data and software app usability test data for the test data.

In at least one embodiment, the method comprises generating, at the server, electronic feedback based on at least one of the protective apparatus risk profile data, the electronic device usability data and the software app usability data and sending the electronic feedback in the electronic message to the user device.

In at least one embodiment, the method comprises generating, at the server, an electronic notification based on at least one of the electronic device usability test data and the software app usability test data and sending the electronic notification in the electronic message to the user device.

In at least one embodiment, the method comprises generating, at the server, an electronic recommendation based on the electronic claims distribution data and the protective apparatus risk profile and sending the electronic recommendation in the electronic message to the user device.

In at least one embodiment, the method comprises storing customer data, warranty data, protective apparatus data, electronic device data, software app data, time data, and geography data along different dimensions of the multidimensional data structure and storing event data and electronic claims data in the data store.

In at least one embodiment, the method comprises applying Online Analytical Processing (OLAP) to the multidimensional structure to generate a customer OLAP data cube that includes customer risk profile data, customer cluster data and electronic claim distribution data.

In at least one embodiment, the method comprises applying Online Analytical Processing (OLAP) to the multidimensional structure to generate a protective apparatus (OLAP) data cube that includes protective apparatus risk profile data.

In at least one embodiment, the method comprises applying Online Analytical Processing (OLAP) to the multidimensional structure to generate an electronic device (OLAP) data cube that includes electronic device risk profile data and data related to electronic device usability testing.

In at least one embodiment, the method comprises applying Online Analytical Processing (OLAP) to the multidimensional structure to generate a software app OLAP data cube that includes software app risk profile data and data related to software app usability testing.

In at least one embodiment, the method comprises determining a customer classifier, at the server, by: fetching a customer record from the customer OLAP data cube for retrieving a given customer's claim history; determining from the claim history whether a high risk label or a low risk label applies to the given customer; updating the customer record for the given customer with the determined risk label; generating training samples using the determined labels; repeating the fetching, determining, updating and generating steps for each customer in the customer OLAP data cube; training a customer classifier using the training samples; and storing the customer classifier in the data store.

In at least one embodiment, the method comprises determining a given customer's risk profile, at the server, by: receiving a customer ID; fetching a customer record from the customer OLAP data cube using the customer ID; predicting the customer risk profile for the given customer by applying a customer classifier to one or more data attributes from the customer record of the given customer; and storing the predicted customer risk profile in the customer record for the given customer.

In at least one embodiment, the method comprises determining a customer clusters, at the server, by: fetching a customer record for a given customer from the customer OLAP data cube; building a multivariate time-series for the given customer using data from the fetched customer record; repeating the fetching and building for each customer in the customer OLAP data cube; obtaining a unique pair of multivariate time-series; determining a pairwise similarity score from the unique pair of multivariate time-series; storing the determining pairwise similarity score; repeating the obtaining, determining and storing for each unique pair of multivariate time-series; and generating customer clusters from the stored pairwise similarity scores.

In at least one embodiment, the method comprises predicting data for a given customer, at the server, by: receiving a customer ID; fetching a customer record from the customer OLAP data cube using the customer ID; locating a customer cluster that corresponds to the given customer; and predicting the data for the given customer using data attributes from a centroid of the located customer cluster.

In at least one embodiment, the method comprises determining high risk vs. low risk profiles for certain geographical locations within a given time period, at the server, by: creating maps for several time periods using data from the customer OLAP data cube; fetching an electronic claim from the electronic claims data in the data store; determining a geocode and a time interval for the electronic claim; finding the map for the time interval of the electronic claim and rendering the geocode for the electronic claim; and repeating the fetching, determining and finding for each of the electronic claims.

In at least one embodiment, the method comprises generating region clusters for electronic claims, at the server, by: selecting a geographic region; fetching data about the geographic region from the data store; repeating the selecting and fetching for all geographic regions for which data is stored in the data store; obtaining data for a unique pair of geographic regions; determining a pairwise similarity score for the unique pair of geographic regions; storing the pairwise similarity score in the data store; repeating the obtaining, determining and storing for each unique pair of geographic regions; and generating region clusters from the stored pairwise similarity scores.

In at least one embodiment, the method comprises determining a warranty and pricing policy baseline for newly unseen geographic regions based on known geographic regions, at the server, by: receiving an ID for a new geographic region; fetching data about the new geographic region; locating a region cluster that corresponds to the new geographic region using the fetched data and data from centroids of the cluster regions; and determining the warranty and pricing policy baseline using data from a centroid of the located region cluster.

In at least one embodiment, the method comprises retrieving the electronic device risk profile data and data related to electronic device usability testing for a given electronic device; determining a number of events involving the given electronic device during a certain period of time; determining UI features of the device that were used when the events occurred; classifying the given electronic device as being high-risk or low risk during use; and generating the electronic report including the UI features that were used during the events and the risk classification of the given electronic device.

In at least one embodiment, the method comprises the method comprises retrieving the electronic device risk profile for a given electronic device; and sending the electronic notification to the customer with a warning that using the given electronic device and/or one or more particular functionalities of the electronic device increases the probability a damaging event occurring.

In at least one embodiment, the method comprises: retrieving the software app risk profile data and data related to software app usability testing; determining recent interactions that a customer has with a given software app immediately before an event; and generating the electronic report including the recent interactions with the given software app and the software app risk profile data for the given software app.

In at least one embodiment, the method comprises retrieving the software app risk profile for a given software app; and sending the electronic notification to the customer with a warning that using the given software app increases the probability a damaging event occurring.

In another broad aspect, in accordance with the teachings herein, there is provided at least one embodiment of a server for providing actionable insights based on warranty analytics related to usage of a protective apparatus with an electronic device by a customer, wherein the server comprises: a communication unit for electronically communicating with at least one user device; a data store that is configured to store program instructions for performing warranty analytics, and data comprising OLAP data cubes, a multidimensional data structure and operational data; and a processing unit that is operatively coupled to the communication unit and the data store, the processing unit having at least one processor that is configured to: receive an electronic query from the at least one user device; access at least one of risk profile data and test data from the multidimensional data structure, where the at least one risk profile data and test data include data needed to respond to the electronic query; determine a response to the electronic query by executing the program instructions for the warranty analytics for processing the accessed data; and send an electronic message to the at least one user device, the electronic message including data for answering the electronic query.

In at least one embodiment, the processing unit is further configured to perform any one or more of the methods described in accordance with the teachings herein.

In another broad aspect, in accordance with the teachings herein, there is provided at least one embodiment of a computer readable medium, comprising a plurality of instructions which, when executed on a processing unit, cause the processing unit to implement a method for providing actionable insights based on warranty analytics related to usage of a protective apparatus with an electronic device, wherein the method is defined in accordance with one or more of any of the methods described in accordance with the teachings herein.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 1 is a view of an example of a protective case applied on an electronic device, which in this example is a smartphone.

FIGS. 2A-2C show perspective, side, and magnified side views of a screen protector applied to an electronic device, which in this example is a smartphone.

Figure 3A:
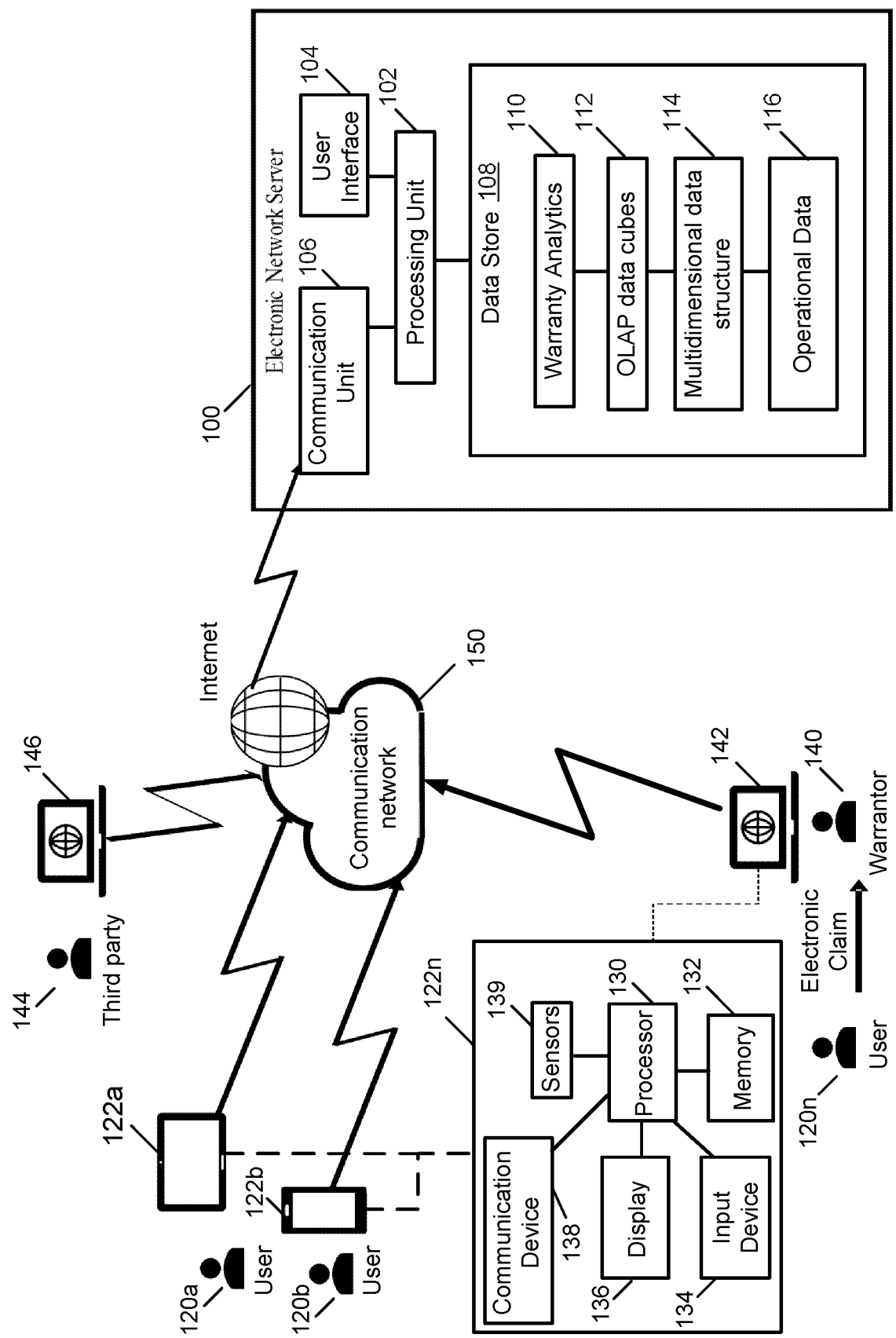
FIG. 3A is a block diagram of an example embodiment of a server for processing multi-dimensional electronic data for determining and providing protection plans and warranty information for use on portable electronic devices.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices, systems or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, these terms can have a mechanical or electrical connotation such as indicating that two elements or devices can be directly connected to one another or connected to one another through one or more intermediate elements or devices via an electrical signal, electrical connection, or a mechanical element depending on the particular context.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term, such as by 1%, 2%, 5% or 10%, for example, if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 1%, 2%, 5%, or 10%, for example.

At least a portion of the example embodiments of the apparatuses or methods described in accordance with the teachings herein may be implemented as a combination of hardware or software. For example, a portion of the embodiments described herein may be implemented, at least in part, by using one or more computer programs, executing on one or more programmable devices comprising at least one processing element, and at least one data storage element (including at least one of volatile and non-volatile memory). These devices may also have at least one input device (e.g., a touchscreen, and the like) and at least one output device (e.g., a display screen, a printer, a wireless radio, and the like) depending on the nature of the device.

It should also be noted that there may be some elements that are used to implement at least part of the embodiments described herein that may be implemented via software that is written in a high-level procedural language such as object-oriented programming. The program code may be written in C, C++ or any other suitable programming language and may comprise modules or classes, as is known to those skilled in object-oriented programming. Alternatively, or in addition thereto, some of these elements implemented via software may be written in assembly language, machine language, or firmware as needed.

At least some of the software programs used to implement at least one of the embodiments described herein may be stored on a storage media (e.g., a computer readable medium such as, but not limited to, ROM, magnetic disk, optical disc) or a device that is readable by a programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions, such as program code, for one or more processors. The program code may be preinstalled and embedded during manufacture and/or may be later installed as an update for an already deployed computing system. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Furthermore, it should be noted that reference to the figures is only made to provide an example of how various example hardware and software methods operate in accordance with the teachings herein and in no way should be considered as limiting the scope of the claimed subject matter. For instance, although FIGS. 1-2C show an example electronic device, which is a smartphone, the scope of the claimed subject matter includes all electronic devices for which the teachings herein are applicable.

A customer uses a specific protective apparatus, e.g. case 12 or protective cover 22 (in FIGS. 1-2C), from a specific manufacturer whose products are certified by an issued warranty. The protective apparatus 12 and the electronic device 10 may be used to provide certain data which is later processed using various analytical techniques in order to provide various actionable insights. For example, either the electronic device 10 and/or the protective case 12 may be able to provide drop data that is collected when the electronic device 10 falls. The protective case 12 and/or the electronic device 10 may have various sensors that can provide the drop data where the sensors include, but are not limited to, a microphone, a proximity sensor, a light sensor, a pressure sensor and an accelerometer. This drop data may be analyzed to recognize if the electronic device 10 was being protected by the protective case 12 at the time of being dropped. The captured drop data may be sent to a server (e.g. server 100 in FIG. 3A which provides warranty analytics and actionable insights) and stored using a data structure (e.g. as operational data 116). In addition to drop data, data about the electronic device such as the device manufacturer, the device type (i.e. smart phone, laptop, etc.), the device brand and data about different protective cases such as, but not limited to, the case material, the case thickness and the impact rating, for example, may also be sent to the server 100 for storage in a database as with the operational data 116 for each user.

The expected cost of the issued warranty policy for an electronic device is generally determined as a function of several variables such as the type, make (i.e. manufacturer), model and year of both the electronic device and the protective apparatus. However, this cost will also depend on whether the customer who is using the electronic device is more likely to damage the electronic device, which may be determined using different variables, and certain analytical techniques including artificial intelligence (e.g. data mining/machine learning) oriented methods in accordance with the teachings herein. For example, a customer who has attached a low-quality protective apparatus to the electronic device and is using the electronic device in a dangerous environment, e.g. an industrial working environment, may be considered as a high risk customer and the issued warranty policy can then take this into account to charge an appropriate price and/or to provide actionable recommendations to the customer such as purchasing a high-quality (i.e. low-risk) protective apparatus in order to decrease the risk of damage which will also reduce the price of the warranty.

As another example, in accordance with the teachings herein, another interesting variable which may have an effect on the issued policy may be the software programs, commonly known as and referred to hereafter as "software apps", that the customer may be using on the electronic device. For example, a software app that has an inconvenient or cumbersome User Interface (UI) design may increase the risk that the customer may drop the electronic device, which may potentially damage the electronic device, when the customer is using the software app. Hence, in such cases, the customer may be considered as being a high risk customer if they frequently use that particular software app.

There are other variables that may be used in certain embodiments for determining the risk level of a customer and thus determining the cost of a warranty's expected cost. The determination of these two values is mathematically complex. Accordingly, in another aspect there is provided hardware, a data warehouse structure as well as methods with sophisticated computational capability that can perform the calculations, determined in accordance with the teachings herein, in an efficient manner in order to determine warranty insurance policies and prices that vary for low and high risk customers and to provide actionable insights for various parties. For example, the long-term and short-term history of events and electronic claims of customers constitute a huge amount of data which cannot be scaled down to a simple platform or processed by a human being. In addition, it is very difficult for a human, let alone simple statistical analysis, to find patterns and correlations which are often hidden inside the data. Accordingly, more power methods described herein may be used to perform this analysis.

Referring now to FIG. 3A, shown therein is an example embodiment of a server 100 that can be accessed by various users including customers 120a to 120b who may use different devices 122a to 122n to communicate via a communication network 150, such as the Internet, with the server 100. The users also include warrantors 140 and third parties 144 who may also use their devices 146 and 142, respectively, to communicate with the server 100 via the communication network 150. A customer such as customer 120n may also directly correspond with a warrantor 140 by using electronic device 122n to send an electronic claim to the device 142 of the warrantor. In creating the electronic claim, the customer 120n may consult with a "Repair Service Technician" who can inspect a damaged device and provide data on the damage specification (i.e. type and severity of data) and estimate the repair costs.

The customers 120a to 120n can interact with the server 100 when they purchase a protective apparatus and install it on her electronic device. This interaction involves the customer registering and inputting data about herself, her electronic device, and the protective apparatus at the server 100. This may be done through one or more user interfaces 104 that are provided by the server 100. The inputted data is stored as part of the operational data 116 at the data store 108.

Although the devices 122a to 122n may be different types of devices (i.e. laptops, tablets, smartphones, etc.) they generally have similar main components that allow the customers 120a to 120n to communicate with the server 110. Furthermore, devices 142 and 146 may have similar main components. Therefore, for illustrative purposes, the components of the device 120n will be discussed but it should be understood that these components also generally apply to the devices 120a, 120b, 142 and 146. The device 120n comprises a processor 130, an input device 132, a memory 134, a display 136 and a communication device 138. The electronic device 122n may include further components needed for operation as is known by those skilled in the art such as a power unit (not shown) which can be any suitable power source that provides power to the various components of the device 122n such as a power adaptor or a rechargeable battery pack.

The processor 130 may be a standard processor that controls the operation of the device 122n and becomes a specific processing device when executing certain programs to allow it to submit electronic claims to the device 142 and to interact with the server 100. The memory unit 132 generally includes RAM and ROM and is used to store an operating system and programs as is commonly known by those skilled in the art. For instance, the operating system provides various basic operational processes for the device 122n. The programs 222 include various user programs so that the customer 120n can interact with other devices such as the device 122n and the server 100.

The input device 134 may be at least one of a touchscreen, a touchpad, a keyboard, a mouse and the like depending on the device type of the device 122n. Alternatively, the input device 132 may be a graphical user interface that is used with an Application Programming Interface (API) or a web-based application so that the customer 120b may provide input data and receive data or electronic messages from other electronic devices such as the communicate electronic device 142 of the warrantor or the server 100.

The display 136 can be any suitable display that provides visual information depending on the configuration of the device 122n. For instance, the display 136 can be a display that is suitable for a laptop, tablet or handheld device such as an LCD-based display and the like. The communication device 138 may be a standard network adapter and/or a wireless transceiver that communicates utilizing CDMA, GSM, GPRS or Bluetooth protocol according to standards such as IEEE 802.11a, 802.11b, 802.11g, or 802.11n. The communication device 138 can provide the processor 130 with a way of communicating with other devices or computers.

The server 100 receives various queries for different groups of entities such as the customers 120a-120n, warrantors 140 and third parties 144. The general interaction between the server 100 and the various groups of entities are described in further detail below. The server 100 generally comprises a processing unit 102, a user interface 104, a communication unit 106 and a data store 108. The data store 108 stores various computer instructions for implementing various programs and providing certain functionality. The data store 108 also stores data that is used by the server is performing analytics and providing actionable insights to the entities that interact with the server 100. For example, the data store 108 can store program instructions for various warranty analytics 110 and the data store 108 can store various data including OLAP data cubes 112, a multidimensional data structure 114 and operational data 116. Alternatively, or in addition thereto, other data stores may also be employed to store the data and these data stores may be remote from the server 100.

The processing unit 102 controls the operation of the server 100 and may comprise one or more suitable processors that can provide sufficient processing power depending on the configuration, purposes and requirements of the server 100 as is known by those skilled in the art. For example, the processing unit 102 may comprise a high performance processor that becomes a specific purpose processor when executing program instructions for performing the warranty analytics. In alternative embodiments, the processing unit 102 may include more than one processor with each processor being configured to perform different dedicated tasks. In alternative embodiments, specialized hardware may also be used to provide some of the functions provided by the processing unit 102.

The processor unit 104 can also execute program instruction for a graphical user interface (GUI) engine that is used to generate various GUIs, which form the user interface 104. The various entities (customers 120a-120n, warrantors 140 and third parties 144) may interact with the user interface 104 to provide input data and input electronic queries to the server 100 for performing various analytics. The user interface 104 may send the analytical results to the device 122a-122n, 142 and/or 146 that made the electronic query for display thereat. Alternatively, or in addition thereto, the communication unit 106 can send any electronic notifications, electronic recommendations, analytical reports and advertisements that may be generated as a result of the electronic query.

The data store 108 stores various program instructions for an operating system, and certain analytical applications for the warranty analytics 110 as well as the data mentioned earlier. The analytical applications comprise program code that, when executed, configures the processor unit 102 to operate in a particular manner to implement various functions and tools for the server 100. The data store 108 can include RAM, ROM, one or more hard drives, one or more flash drives or some other suitable data storage elements such as disk drives, etc.

The server 100 can determine pricing data and warranty plan choices for a specific customer based on the customer's risk profile as well as the risk profiles of her electronic device and her protective product. The customers 120a to 120n may also receive at least one of electronic recommendations, electronic notifications, and electronic ads from the server 100. The methods that are employed to determine these different data items and provide these various recommendations include, but are not limited to, a warranty plan and/or a protective apparatus, for example, to the customer as well as provide other recommendations, notifications and electronic ads are described in further detail herein.

The warrantor 140 can interact with the server 100 to utilize various analytical tools that are provided by the server 100 such as warranty analytics. For example, the warrantor 140 can receive data marts (i.e. charts and reports) regarding the risk profiles of one or more of customers, protective apparatuses, electronic devices, and software apps by interacting with warranty analytics software tools 110, 356 at a top tier of a software architecture that is employed by the server 100. The warrantor 140 can then use the analytical data from one or more of the analytical tools to make some decisions or do a plan forward such as determining which geographic regions and/or protective apparatuses to provide warranties for. It should be noted warrantor 140 may also be known as a warranty company, third party administrator or underwriter.

The third parties 146 include, but are not limited to, protective apparatus manufacturers, electronic device manufacturers, software app developers, and advertisers. The third parties may subscribe/register their products with the server 100 in order to receive various analytical feedback as described herein. For instance, a protective device manufacturer, may subscribe its screen protector products with the server 100 and receive analytical feedback such as, but not limited to, (1) which protective products are able to save an electronic device from certain types of events, (2) what part of a protective apparatus is deficient to save an electronic device from certain types of damage, (3) how popular certain protective products are, (4) how many users are satisfied with certain protective products by considering any damages that occurred to the electronic device while the protective product was being used, (4) some statistics about the demographic information of the customers who purchase certain protective products, which may be used to provide recommendation purposes. This may be done by receiving an electronic query from a user, analyzing data obtained from certain data sets such as the electronic device OLAP data cube 306, the protective apparatus OLAP data cube 304, and the software app OLAP data cube 308 in order to address the query and then providing feedback to the user for the analysis and actionable insights related to the user's electronic query. The analytical feedback may be provided by electronic notification, e.g., the server 100 can send a report by email to a manufacturer, or via a website (e.g. a web application).

Figure 3B:
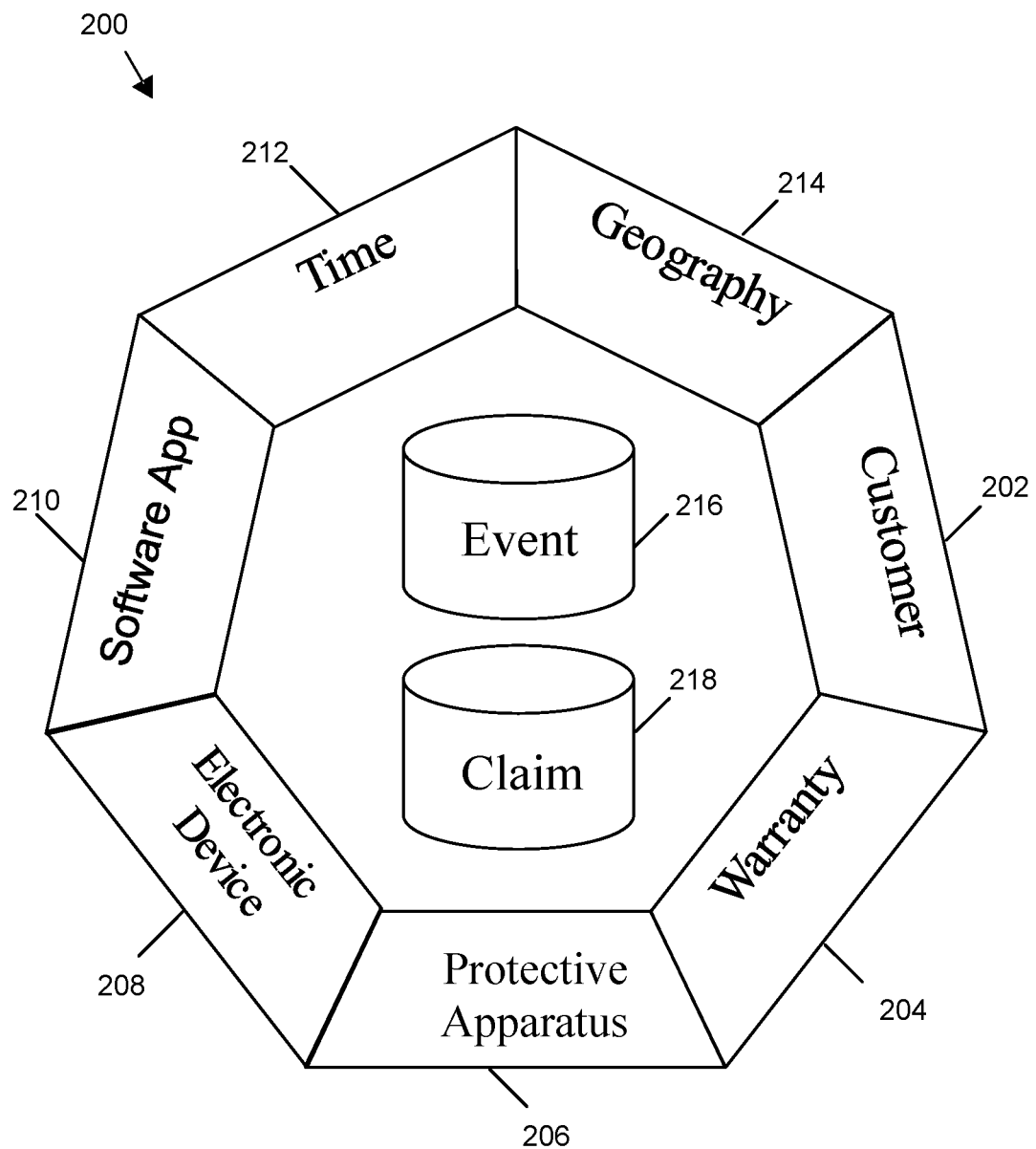
FIG. 3B is a diagram illustrating an example embodiment of data components of the multidimensional data structure used by the server of FIG. 3A.

Referring now to FIG. 3B, shown therein is a multidimensional data structure 200 which organizes data about the variables 'customer' 202, 'warranty' 204, 'protective apparatus' 206, 'electronic device' 208, and 'software app' 210 as its dimensions and expresses the relationships between these variables within the 'time' and 'geography' dimensions. Each cell within the multidimensional data structure 200 contains aggregated data related to elements along each of its dimensions. The multidimensional data structure 200 is used to blend multiple dimensions, including dynamic information such as drop data gathered by the protective apparatuses and other more stable or slowly changing data such as the demographic data of customers.

Figure 4A:
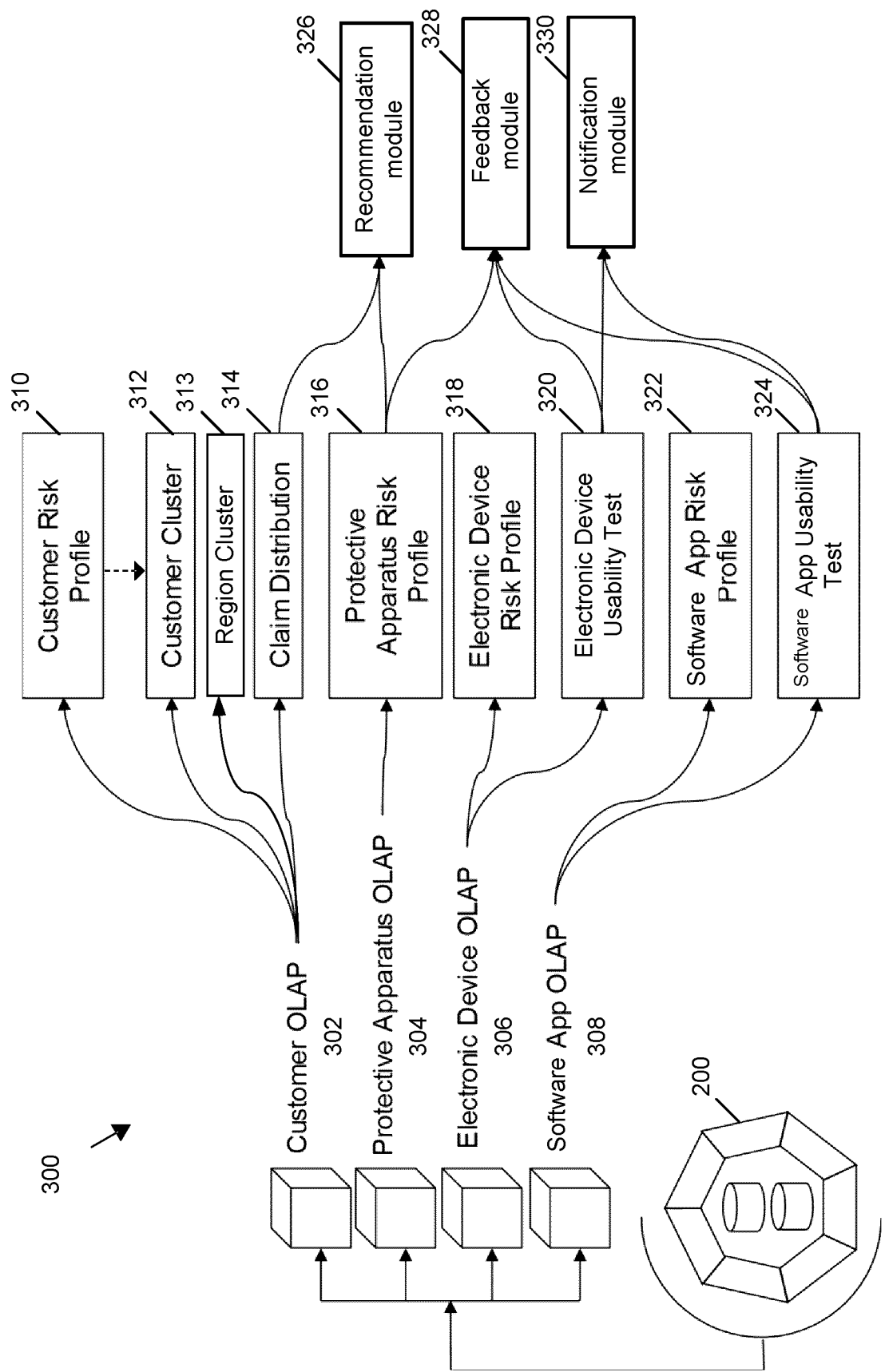
FIG. 4A is a diagram illustrating an example embodiment for deriving actionable insights using various analytical methods on multidimensional data, i.e., OLAP data cubes, regarding customers, electronic devices, protective apparatuses, and software apps profiles utilizing artificial intelligence (AI) including data mining and machine learning techniques.
Figure 4B:
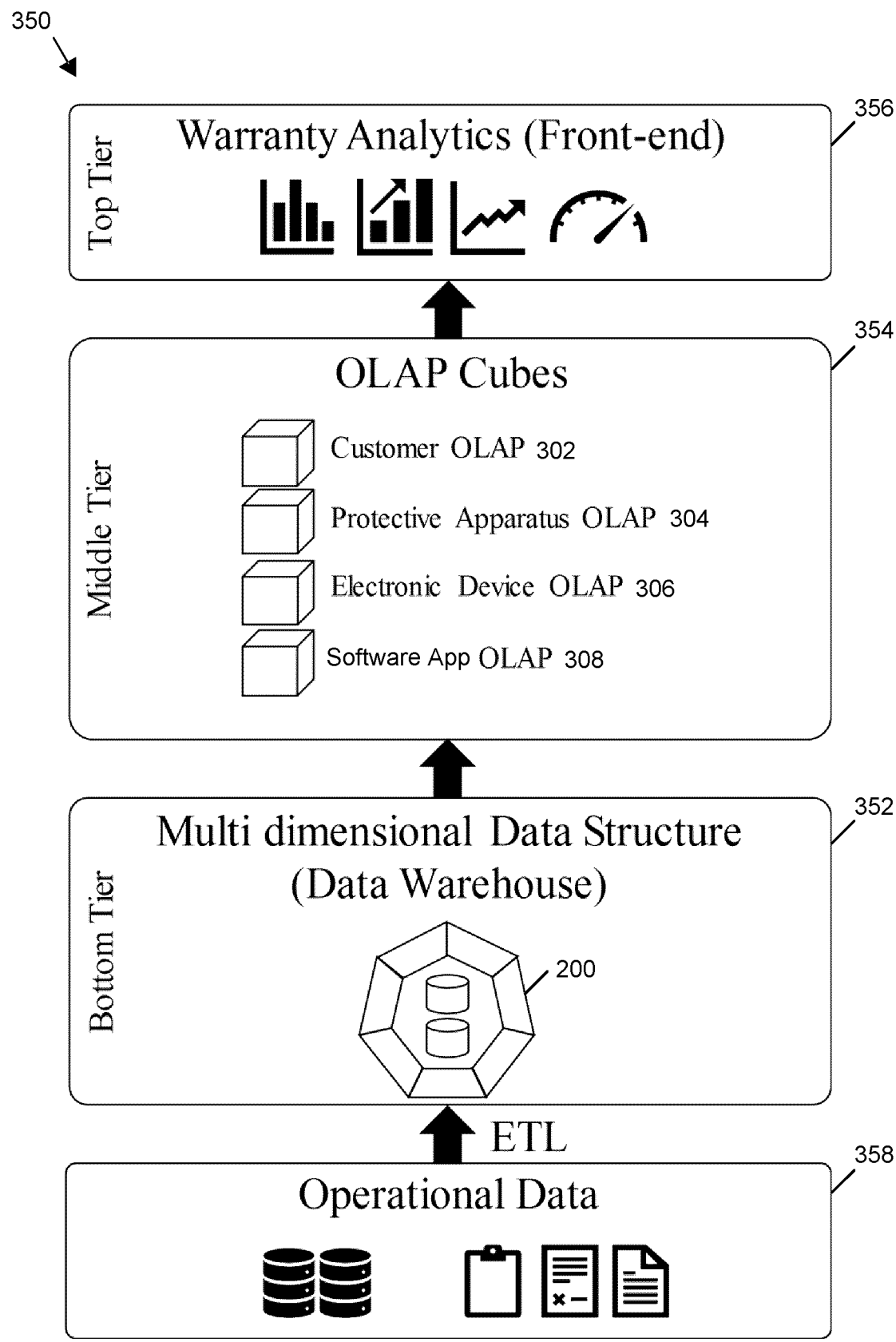
FIG. 4B is a diagram of an example embodiment of a tiered software architecture that can be used by the server of FIG. 3A.

The multidimensional data structure 200 may be broken into data cubes and the data cubes are able to store warranty related data and be used to access the warranty data within the data confines of each cube (examples of cubes are shown in FIGS. 4A and 4B). Even when data is manipulated it remains easy to access and continues to constitute a compact database format and the data still remains interrelated. For example, if any updates happen to the operational data 116, then the data warehouse (i.e. multidimensional data structure 200) is automatically updated. For instance if an existing customer changes their location then this change is reflected in the data warehouse automatically without any design change. A multidimensional data structure is the de facto standard for analytical databases behind online analytical processing (OLAP) applications. However, the multidimensional data structure 200 has been configured to have certain dimensional data for use in solving the technical challenges encountered herein.

In another aspect, in accordance with the teachings herein, AI-powered methods (i.e. data mining and machine learning algorithms. e.g. in methods 400, 450, 500, 600, 700 and 750 in FIGS. 5A, 5B, 6A, 6B, 9 and 10, respectively) may use raw data (i.e. the operational data 116) upon which ETL is applied to build the multidimensional data structure 200 from which the OLAP data cubes can be generated and data models can be created to generate answers quickly to complex analytical queries about different dimensional variables, i.e., warranty policies, protective apparatuses, electronic devices, software apps, and customers, including, but not limited to, expected cost of an issued policy for a customer and her electronic device which hosts particular software apps and is protected by a protective apparatus.

In terms of the 'customer' dimension 202, the multidimensional data structure 200 and at least one of the methods described in accordance with the teachings can be used to provide data-driven decisions and actionable insights regarding customers including determining high risk vs. low risk customers by generating a customer risk profile. In at least one embodiment, this may be done using methods 400 and 450 (see FIGS. 5A and 5B). Further, the multidimensional data structure and at least one of the methods described in accordance with the teachings herein can be used obtain profile usage patterns of a customer regarding each of her electronic devices within certain time periods and provide a personalized recommendation of a particular protective apparatus to the customer (for example through a multivariate time series for a customer determined from a spatio-temporal distribution of her events). This is of high value for the customer since it saves time and effort to find a best fit to protect her electronic device among the myriads of options and choices available for protective cases, screen protectors and warranty plans. This may be done by using method 500 of FIG. 6A and the protective apparatus risk profile 316, for example. Furthermore, by profiling the usage pattern of each customer regarding each device, the data analytics framework described herein allows device manufactures to perform future planning that can lead to the development of new protective apparatuses.

In terms of the 'protective apparatus' and 'electronic device' dimensions 206 and 208, the multidimensional data structure 200 and at least one of the methods described in accordance with the teachings herein can be used to allow manufacturers to identify high risk products. Further, the manufacturers are able to perform future planning and market analysis that can provide additional selling opportunities for different electronic devices and protective apparatuses for use by a company as well as by individuals. For example, this may be done by obtaining the protective risk apparatus profile 316 and the electronic device usability test 320 and generating feedback using the feedback module 328.

In terms of the 'software app' dimension 210, the multidimensional data structure 200 and at least one of the methods described in accordance with the teachings herein may be used by software app developers in designing convenient user interfaces for software apps (i.e. convenient UIs are easier to use UIs that do not increase the risk of the electronic device being dropped or otherwise damaged when the software app is used). For example, based on the historical data of recorded potential damaging events, which may be stored in an events database, such as the time and place for a drop of or a hit to an electronic device and software app data for the software apps that were used at the same time the event occurred, the multidimensional data structure 200 and at least one of the methods described in accordance with the teachings herein is able to determine and provide feedback on high risk software apps, i.e., software apps whose poor user interface design increases the risk of potential damaging event (e.g., drop). For example, this can be implemented using a software app risk profile 322 and software app usability test 324 shown in FIG. 4A.

Referring again to FIG. 3B, the time dimension 212 is used for any historical data analytics within time is broken into a hierarchy of time intervals, e.g., hourly, daily, weekly, monthly, and/or yearly. For instance, the time dimension 212 can be used to store data from monitoring and tracking a customer's usage of a protective apparatus on her electronic device or store data for her electronic claims that are submitted within a certain time period such as on a daily basis, a weekly basis or a higher level time period such as on a monthly or yearly basis.

The geography dimension 214 together with the time dimension 212 can be used to perform spatio-temporal data analytics. For instance, the geography dimension 214 can be used to collect data to monitor and track a customer's usage of a protective apparatus on her electronic device within different geographical locations where an event occurred which includes, but is not limited to, a town, a city, or a country, for example.

The customer dimension 202 includes demographic data about customers such as, but not limited to, age, gender, profession, and education level, for example. The demographic data may be collected when a customer is initially performing an online registration for a protective apparatus that they purchased, which may for example, be done at a website provided by the server 100 or another means of data entry.

The warranty dimension 204 includes data about warranty policies such as, but not limited to, coverage period, warranty terms, and warranty conditions, as well as data about one or more warrantors such as, but not limited to, name, and address, for example. For example warranty terms and conditions may be a 1 year Accidental Damage plan with a $50 deductible, covering any accident or water damage on the electronic device. Another example, may be a 1 year Accidental Damage plan covering screen damage only up to $300 with a $0 deductible. The warranty data on warranty policies can be provided by the warrantors and added to the data store 108. The data store 108 for the warranty dimension can be updated whenever a warranty policy is changed or a new warranty policy is added.

The protective apparatus dimension 206 includes data about the protective apparatuses such as, but not limited to, manufacturer, apparatus material, apparatus size, and apparatus color. The protective apparatus data can be provided when a customer initially performs an online registration of their protective apparatus, for example, at a website provided by the server 100. For instance, the customer using the protective apparatus may have to register a tag with the electronic device whenever the customer puts a new protective apparatus on the electronic device. The tag may contain data about the protective apparatus such as device type brand and the like.

The electronic device dimension 208 includes data about the electronic devices that are used by the customers with the protective apparatus that they purchased. For example, the electronic device data can include various data such as, but not limited to, manufacturer name, wireless carrier name, device type, device model, device color and device size. The electronic device data can be provided when a customer initially performs an online registration of their protective apparatus, for example, at a website provided by the server 100.

The software app dimension 210 includes data about the software apps including but not limited to, name, version, and running platform, for example, that are being used at the time of the electronic device being dropped. This data can be provided automatically after the electronic device has been registered by the customer at a website provided by the server 100.

The above-said dimensions can be interrelated by other dimensions in the multidimensional data structure 200 including fact data such as, but not limited to, event data and claim data.

The event data 216 from the events database is data about potentially damaging events such as, but not limited to, for example, a device impact, a device scratch, a device drop, the location of the event, the time of the event, and the software apps that were used just before the event. For example, an instance of event may be:

"John has dropped his iPhone 6S today, Jan. 1, 2019, at his job located in 43.6597136° N (latitude), −79.3797687° W (longitude), Toronto, ON., Canada, while sending messages by MessageApp. At the moment, his phone is under 1-year limited warranty from WarrantyCo for using ProtectCo's InvisibleShield as a screen protector."

Depending on the type of event, different data items are recorded either automatically or manually to specify the relevant details for an event. For example, in a drop event, built-in sensors can provide sensory data such as, but not limited to, motion (e.g., from an accelerometer) and/or orientation (e.g., from a gyroscope) including height and angle of drop, and whether the face of the electronic device is oriented down/up at the end of the drop. Data about the surface type can be provided manually by the user. In addition, the most recent interactions that the customer had with a software app immediately before the electronic device drop can be recorded automatically, which can be done using off the shelf software (e.g. www.appsee.com). As another example, when a scratch event occurs on the screen of the electronic device, the length and depth of scratch can be recorded manually or automatically using known techniques. For example, for protective cases that are used with the electronic devices, it may be inferred that there is a strong correlation between the electronic device's orientation when a part of the device hits a surface (e.g., corner drop) and the amount of damage in drop events.

The event data 216 is sent from a customer's device to the server 100; the event data may be part of an electronic claim or separate from an electronic claim. The event data 216 may be collected automatically by an event monitoring software application that is executing on the customer's device. The event monitoring software application may be installed at the customer's device when the customer initially registers their protective apparatus with the server 100. The event data 216 can be mined and analyzed to generate risk and usage profiles for one or more of customers, protective apparatuses, electronic devices, and software apps.

The claim data 218 includes data items for warranty claim electronic transactions filed by a customer for replacement, repair, and/or compensation of her damaged electronic device. Accordingly, the claim data 218 is also part of the electronic claim that is sent from a customer's device to the server 100. The claim data 218 is different than event data 216 in the sense that an event does not necessarily have to an associated claim. For example, a customer may drop their electronic device today from a height of 1 m and there is no damage so this is an event without an electronic claim. However, if some damage occurred to the electronic device during this event, such as broken glass, there may be an associated electronic claim that the customer may file online via a user interface 104 of the server 100 that includes the cost for repairing the device. For example, an instance of a warranty claim electronic transaction may be:

"John has filed a claim regarding his phone's broken glass on Jan. 2, 2019, submitting required documents. The warrantor confirmed the claim and fully paid the expenses for repair."

Data items that may be included in claim data 218 includes, but is not limited to, damage specification such as a pattern of damage (e.g., shatter or small crack) and the cost of repairing the damage, for example.

Based on the available data in the various dimensions of the multidimensional data structure 200 and the fact data (i.e. the event data 216 and the claim data 218), in accordance with the teachings herein, AI-powered data analysis may be performed to provide historical, current and predictive views of certain aspects of one or more of: 1) customers, 2) electronic devices, 3) protective apparatuses, and 4) software apps. To do so, referring to FIG. 4A, smaller data structures called OLAP data cubes can be generated from the multidimensional data structure 200. The OLAP data cubes may be populated with data related to various data profiles that can be created for various aspects of an electronic claim though a process called Extract-Transform-Load (ETL). The ETL tools may be provided by various software packages including, but not limited to, SQL Server Integration Services (SSIS) from Microsoft SQL Server database software and/or the Oracle Warehouse Builder (OWB). Using ETL tools facilitates a broad range of data migration tasks from the multidimensional data structure 200 to the various OLAP data cubes.

The OLAP data cubes are data elements of the multidimensional data structure 200 and have a reduced number of data dimensions. The set of all OLAP data cubes makes up the multidimensional data structure 200. In at least one embodiment described herein, the OLAP data cubes comprise a customer OLAP data cube 302, a protective apparatus OLAP data cube 304, an electronic device OLAP data cube 306 and a software app OLAP data cube 308. All of the OLAP data cubes 302 to 308 have access to various dimensions, the events data 216 and the claim data 218 of the multidimensional data structure 200. The OLAP data cubes 302 to 308 can be used to provide a variety of analytical data including one or more of a customer risk profile 310, customer cluster data 312, region cluster data 313, claim distribution data 314, protective apparatus risk profile data 316, electronic device risk profile data 318, and software app risk profile data 322, as well as data related to an electronic device usability test 320, and a software app usability test 324. These analytical data include different types of information related to For example, the claim distribution 314 is a spatio-temporal distribution of a customer's electronic claims.

At least some of the analytical data 310 to 324 can then be used as input to various analytical reporting modules that provide electronic messages to the particular users (e.g. customers, warrantors, etc.) that submitted a user electronic query requesting particular analytical data from the server 100. In at least one embodiment, the analytical reporting modules include at least one of a recommendation module 326, a feedback module 328 and a notification module 330. Two or more inputs may be provided to the modules 326, 328 and 330 since they are running on a predefined set of items regardless of their types. For example, the recommendation module 326 may receive a set of data items (e.g., protective cases, electronic device, screen protectors, etc.) and a set of targets (e.g., customers) and then broadcast the data items to the targets as recommendations. Accordingly, in at least one embodiment herein, more reliable and customizable recommendations for users may be provided by blending multiple data dimensions, including dynamic data gathered by the protective apparatus and demographic data for customers.

For example, to recommend low risk protective apparatuses to customers who are members of same cluster, the recommendation module 326 may recommend a protective case from a specific manufacturer to customers whose main activity is above the earth's surface and the protective case has been identified to reduce risk or be a low risk for a customer cluster whose members' on average are at a similar height above the earth's surface.

Furthermore, in at least one embodiment, some examples of electronic feedback that may be provided by the feedback module 328 include providing an electronic message to a software app developer that an increased risk of damage to an electronic device may occur when a particular software app is being used due to analysis of previous electronic claims. Some examples of electronic notification that may be provided by the notification module 330 include providing a warning to a user of the electronic device that the risk of dropping or damaging the electronic device is higher when certain apps are running or certain functionalities are being provided by the electronic device. This may be determined by analyzing the software app data 210 in terms of the percentage of times that a particular software app was executing at the time of an event and comparing it to a threshold. The threshold can be determined statistically by comparing the percentage of times that other software apps were executing at the time of an event or from a statistical distribution indicating that the occurrence of the software app executing during an event is statistically significant.

In at least one example embodiment, the recommendation module 326 may be provided with at least one of claim distribution data 314 for one customer and protective apparatus risk profile data 326 so that the recommendation module 326 may provide a recommendation to a customer who has an electronic device of a protective apparatus that the customer may purchase based on the correlation between the risk profile data of the electronic device or the protective product and demographic information of the customers. For example, based on geographic region (e.g. Toronto) and time (e.g. the summer or fall), a low-risk profile protective apparatus can be found per electronic device. Then, based on the customer's region and time interval, after the above-noted analysis is performed the recommendation module 326 may recommend to the customer which product to purchase. This is advantageous since due to a huge number of protective apparatuses and protection plans available to protect an electronic device, customers are overwhelmed with the myriad of available options. Since customers have limited time to check all of these options, the recommendation module 326 can play an important role to uniquely present a specific product to customers based on their particular circumstances (i.e. risk profile, and demographics).

In another instance, in at least one example embodiment, at least one of protective apparatus risk profile data 326, electronic device usability test 320 and software app usability test 324 may be provided to the feedback module 328 so that it can provide electronic feedback about which protective apparatuses, electronic devices, and software apps are low-risk/high-risk. This electronic feedback can be provided to the protective apparatus manufacturers, the electronic device manufacturers, and the software app developers so that they can use the feedback to redesign their high-risk products so that they are more robust and convenient to use and allow for low-risk usage by customers.

In another instance, in at least one example embodiment, data related to at least one of electronic device usability test 320 and software app usability test 324 may be provided to the notification module 330 so that it can provide electronic notifications to customers to notify them about the risk of a damaging event while the customers are using their electronic device or software apps. This is important for customers as it lets them to take precautionary steps to reduce the probability of a damaging event from occurring while they are using an electronic device or interacting with a software app that has a higher risk.

Referring now to FIG. 4B, shown therein is a multi-tier software architecture 350 that can be used by the server 100. As shown, the bottom tier 352 includes the multidimensional data structure or data warehouse 200 in order to store various data dimensions as well as event and case fact data. For example, some files, e.g., excel sheets and/or word documents, may be generated that is not necessarily stored in the multidimensional data structure 200 but in another database. For instance, the customer might upload some evidence about the damage that happened to her electronic device. The multidimensional data structure 200 collates data through Extract, Transform, Load (ETL) processes from a wide range of sources within an organization at based on operational data 258 obtained at an operational level, e.g., at least one of a customer registration database and product registration database as well as at least one of files and/or manual claim reports, and the like. By performing ETL processes, data is extracted and converted to a format or structure that is suitable for querying and analysis, and the data can then be loaded into the data warehouse 200. For example, the conversion may include converting a scanned version of a word document which is an image to a tabular representation of data, or analyzing images showing damage and saving the results using statistical data that indicates the severity of damage. The ETL processes leverage staging storages and apply a series of rules or functions to the extracted data before loading. For instance, this may include querying different parts of the operational data 116, finding new data, updated the stored data to include the new data, and deleting data where the data may be about customers, electronic devices, protective apparatuses, warranty policies, and/or software apps, in order to create a history or keep track of these entities.

In the middle tier 354, an OLAP data cube is populated with data from the multidimensional data structure 200 for various aspects that can be used to provide predictive analytics which can be used in providing electronic recommendations, electronic feedback and electronic notifications. For instance, in at least one example embodiment in accordance with the teachings herein, there is at least one of a Customer OLAP data cube 302, a Protective Apparatus OLAP data cube 304, an Electronic Device data cube 306, and a Software App data cube 308. An OLAP data cube provides hierarchical dimensions leading to conceptually straightforward operations in order to facilitate various analytics that are performed in the top tier of the software architecture in terms of increased both efficiency (i.e. accuracy) and increased performance (i.e. speed) due to the multidimensionality nature of the data structure instead of being a tabular (flat) data structure. For instance, performing an "Drill Down/Up" OLAP operation on the Customer OLAP data cube 302 allows one to navigate among levels of data ranging from the most summarized (i.e. up or higher level) to the most detailed (i.e. down or lower level) about a customer within certain time intervals in different geographical locations. For example, this may involve, but is not limited, to determining the percentage of customers/ protective apparatuses, electronic devices/mobile apps that are low-risk/high-risk, and what is average electronic claim cost within a certain time period like the last year.

The aforementioned tiers 352 and 354 are used to populate data in an optimized data structure which may then be used for further complex machine learning/data mining algorithms at the top tier 356. Different machine learning methods such as, but not limited to, reinforcement learning and deep learning methods may be used. The top tier 256 contains one or more querying and reporting tools for performing analysis and business intelligence such as, but not limited to, creating one or more of customer risk profiles, protective apparatus risk profiles, electronic device risk profiles and software app risk profiles, generating usability test reports for at least one of electronic devices and software apps, and applying clustering techniques for at least one of customers and regions, to name a few. At the top tier 356, the analytical result may be delivered for decision supports in terms of a report, a chart, a diagram, electronic notification messages (e.g. from the notification module 330), electronic recommendation messages (e.g. from the recommendation module 326), and/or electronic feedback messages (e.g. from the notification module 330).

Figure 8:
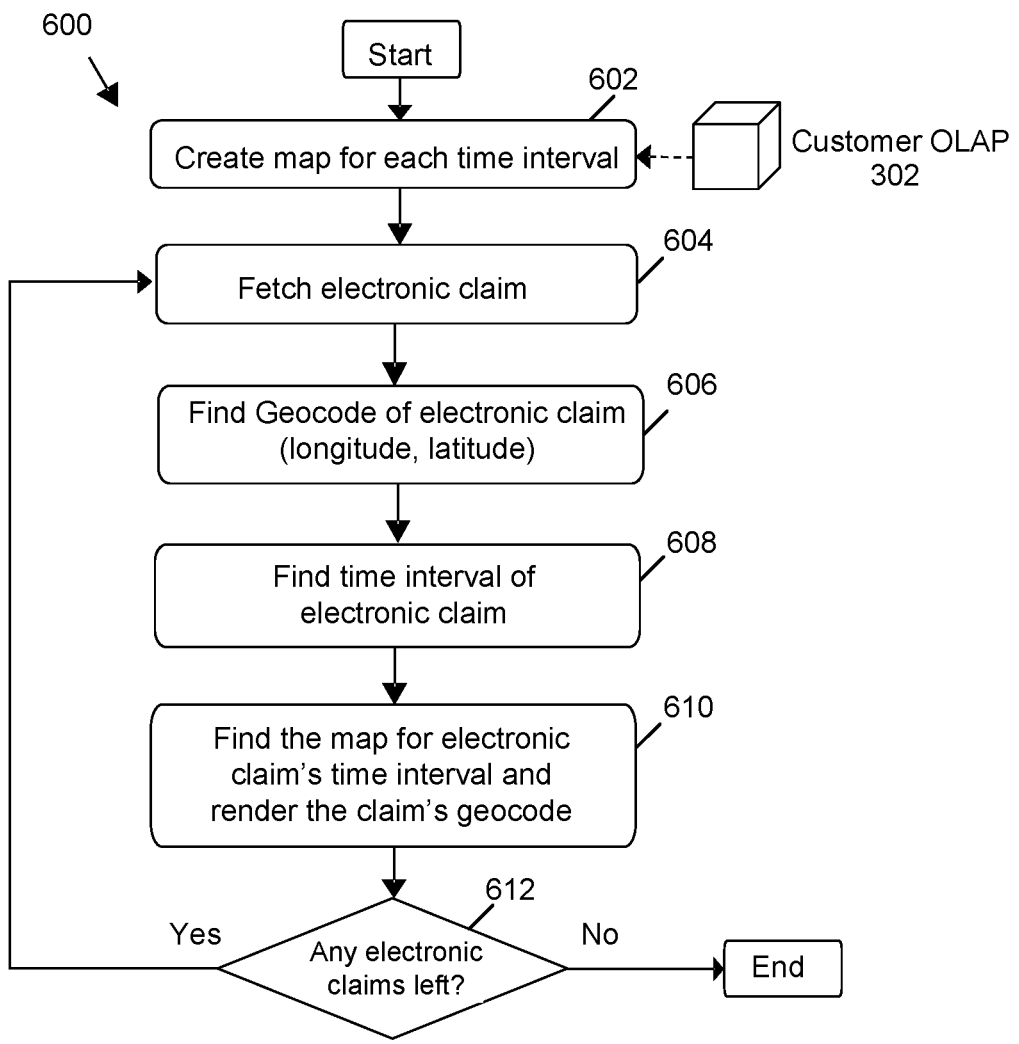
FIG. 8 is a flowchart diagram of an example embodiment of a method for rendering geocodes for electronic claims in a geographic map for each time interval (e.g., monthly).
Figure 9:
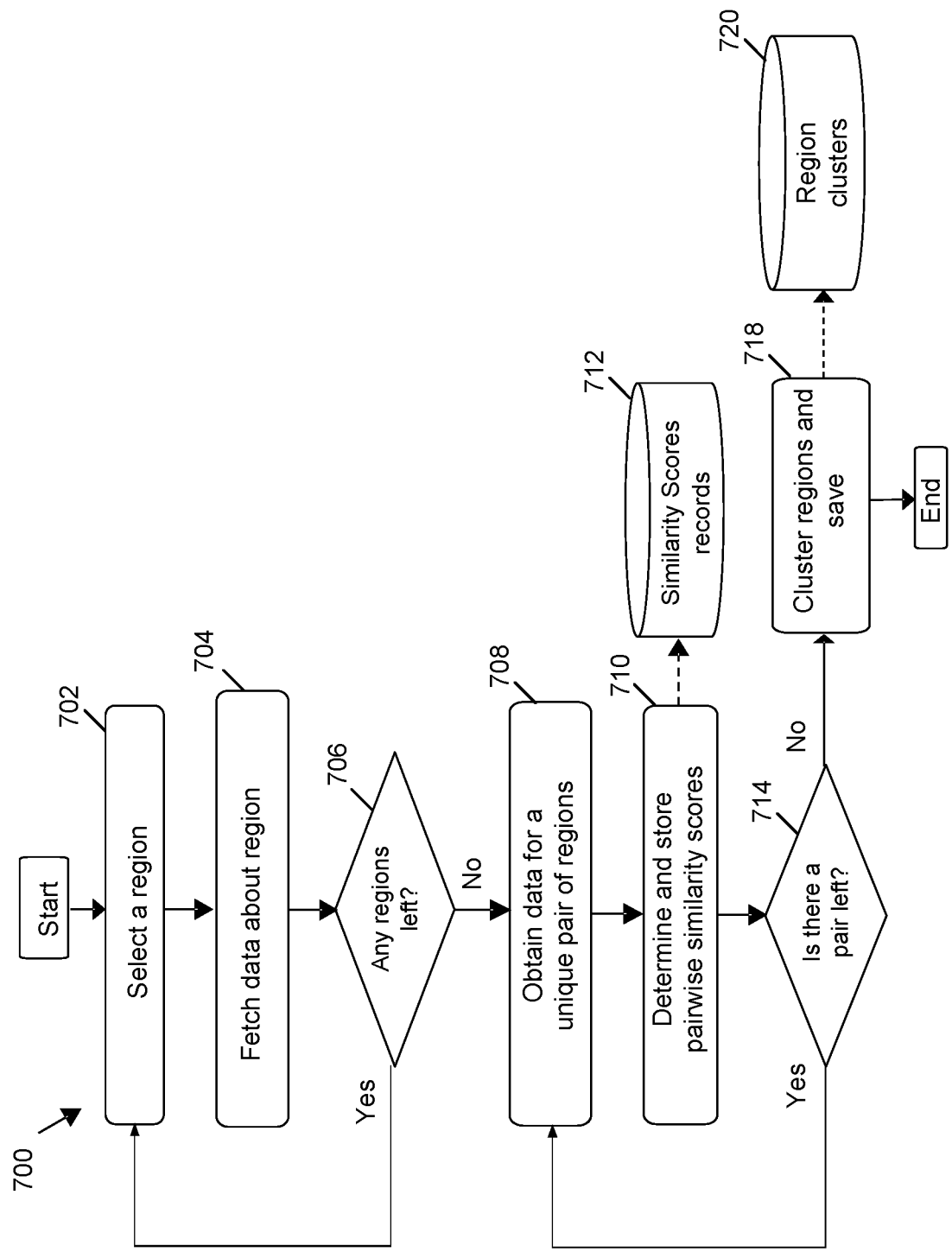
FIG. 9 is a flowchart diagram of an example embodiment of a method for generating region clusters for electronic claims.
Figure 10:
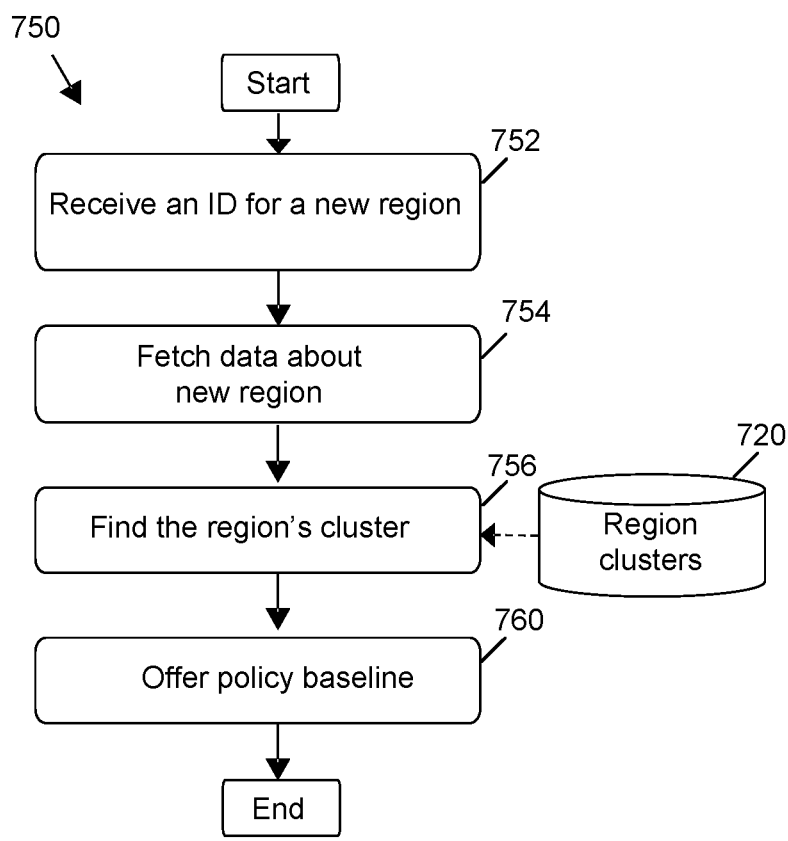
FIG. 10 is a flowchart diagram of an example embodiment of a method for determining a warranty and pricing policy baseline for newly unseen regions based on regions in a similar region group.

Referring again to FIG. 4A, in at least one embodiment, the customer OLAP data cube 302 may include, but is not limited to, at least one of: i) spatio-temporal customer risk profile data 310 which is able to indicate high risk vs. low risk customers on a regional basis (this may be done, for example, by employing method 450 in FIG. 5B), ii) spatio-temporal customer cluster data 312 which can be used to predict yet-to-be-observed data for a given customer based on other known customers (this may be done, for example, by employing method 550 in FIG. 6B), and iii) spatio-temporal electronic claim distribution data 314 for various customers' electronic claims which can be used perform at least one of forward planning for certain regions per certain time intervals (this may be done, for example, by employing method 600 in FIG. 8), and providing electronic recommendations for warranty and pricing policies for all time intervals of a new geographic region (this may be done using methods 700 and 750 in FIGS. 9 and 10, respectively).

The customer risk profile data 310 may be used to "classify" each customer into a low risk class or a high risk class for the risk of submitting an electronic claim. The customer cluster data 312 is used to group similar customers (i.e. user customers that have similar data such as at least one of similar demographic data, similar electronic device data, similar warranty data, similar drop patterns and similar risk profile data). The customer cluster data 312 may be used to perform certain analytics such as finding the correlation between device drop patterns and user demographics. For example, by analyzing customer clusters, it may be determined whether customers of similar demographics and similar device drop patterns are grouped in one or more clusters or not. If so, it may be inferred that there may be a correlation between demographic data and drop pattern data. For instance, "males drop phones more often" may be one of the findings. In at least one embodiment, the customer risk profile data 310 may be used as an input for a method for determining customer clustering data 312 (shown by the dotted link) from the customer risk profile 310 to the customer cluster 312 in FIG. 4A). For example, in order to determine the customer clusters, similar customers are grouped and one factor of similarity for a given customer cluster may be having a same customer risk profile.

Figure 5A:
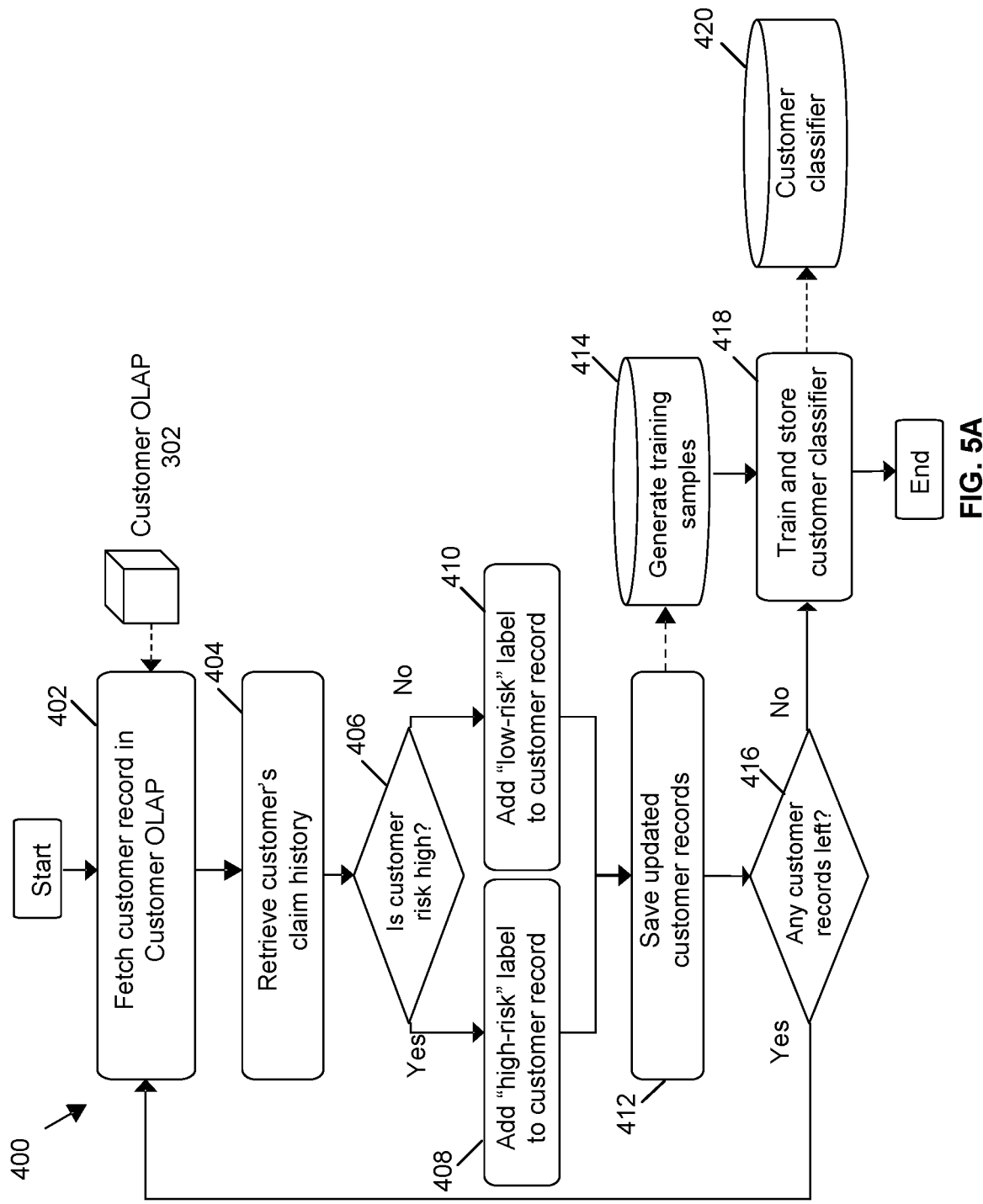
FIG. 5A is a flowchart diagram of an example embodiment of a method for training a spatio-temporal customer classifier.

Referring now to FIG. 5A, shown therein is a method 400 for building a spatio-temporal customer risk profile. The method 400 can be performed by the processing unit 102 of the server 100. In order to build a spatio-temporal customer risk profile, at act 402 the event data for a given customer in the multidimensional data structure 200 as well as the data about the given customer, her electronic device, her protective apparatus, and her warranty are fetched from the customer's record in the Customer OLAP data cube 302. At act 404, the customer's electronic claim history is retrieved for a certain time interval for which the customer risk profile is being created (the customer may have many electronic claims over time). At act 406, it is determined whether the given customer is a high risk or a low risk customer. This may be done by determining an overall cost for the electronic claims submitted by a given customer within a certain desired time interval range (e.g., a month, quarter or year) and applying a threshold to the determined overall cost. The threshold may be determined based on historical data. Next, if comparison of the overall cost with the threshold indicates that the given customer is a high risk customer then at act 408 the customer record is updated with a "high-risk" label. Alternatively, if the comparison of the overall cost with the threshold indicates that the given customer is a low risk customer then at act 410 the customer record is updated with a "low-risk" label. For instance, when the threshold is $70 a first customer who has 10 claims per month worth $100 on average may be considered as a high risk customer contrary to a second customer who has only 2 claims per month worth $50 on average. At act 412, the updated customer records are in the Customer OLAP data cube 302. The labeled customers records are also added to training samples at act 414. At act 416, it is determined whether there are any other customers left to process. If this determination at act 416 is true the method 400 proceeds back to act 402. If the determination at act 416 is false then the method 400 proceeds to act 418 for training a classifier. At act 418, a Boolean classifier is trained and saved as customer classifier 320. For example, some input features for the classifier may be at least one of electronic claim data such as overall cost and number of claims, as well as the event history.

Figure 5B:
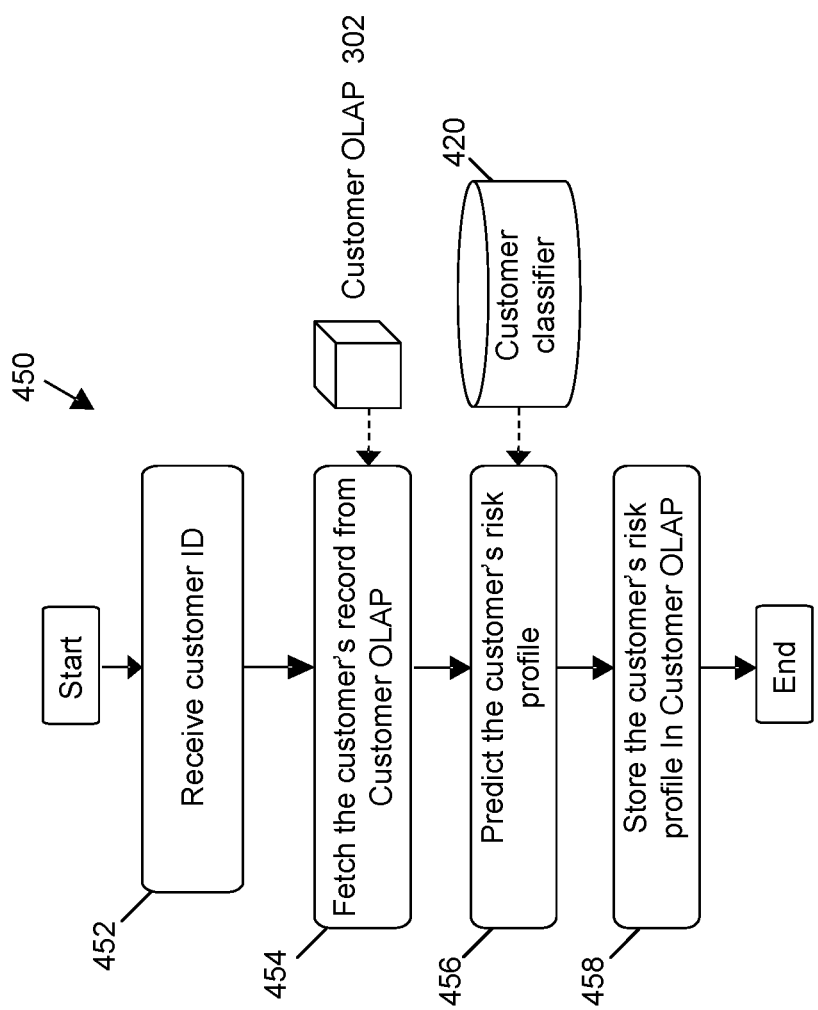
FIG. 5B is a flowchart diagram of an example embodiment of a method for predicting spatio-temporal risk profile for customers.

Once a customer classifier has been generated, a risk profile for a new customer whose risk is unknown or for an existing customer whose risk profile needs to be updated may be predicted, using the trained customer classifier 420 by classifying the customer as belonging to one of two mutually exclusive high risk and low risk classes. This may be done using method 450 which is shown in FIG. 5B. The method 450 can be performed by the processing unit 102 of the server 100. The customer risk prediction method 450 can be used by warranty service providers to determine policy and price adjustments for a new customer or an existing customer based on the predicted risk profile.

For example, an underwriter may look at the risk profile of customers and notice that some customers may be more prone to accidents, and may submit many claims over time which are above the norm compared to other customers. This may be measured in "severity" which is how much cost is associated with each of their electronic claims and "frequency" which is how often an electronic claim is made. This may then affect the costs of the group to which such users are assigned; however, based on the data and analysis described herein these customers who cost the program more money can be filtered out and charged a higher amount while keeping the program fair for the customers in the group with overall costs being more in line with each individual customers' risk profile.

Referring now to FIG. 5B, the customer risk prediction method 450 involves receiving a customer ID for a new customer or an existing customer at act 452. The method 400 can be performed by the processing unit 102 of the server 100. The method 450 then involves fetching the customer's record from the Customer OLAP data cube 302 at act 454. The method 450 then proceeds to predict the customer's risk profile using certain data from the customer's record as input to the customer classifier 420. The predicted customers risk profile is then stored in the Customer OLAP data cube 302 at act 458. For example, in at least one embodiment the customer's risk profile may include a Boolean value (i.e. low versus high) and given certain input parameters may be determined on the fly (as a function) or the risk level may be persisted. Alternatively or in addition thereto, in at least one embodiment, the customer's risk profile may include a history of the customer's risk level for different time intervals. For example, if the analysis is done monthly, in a one year time period, a customer has 12 values each of which shows the customers' level of risk for a given month.

Figure 6A:
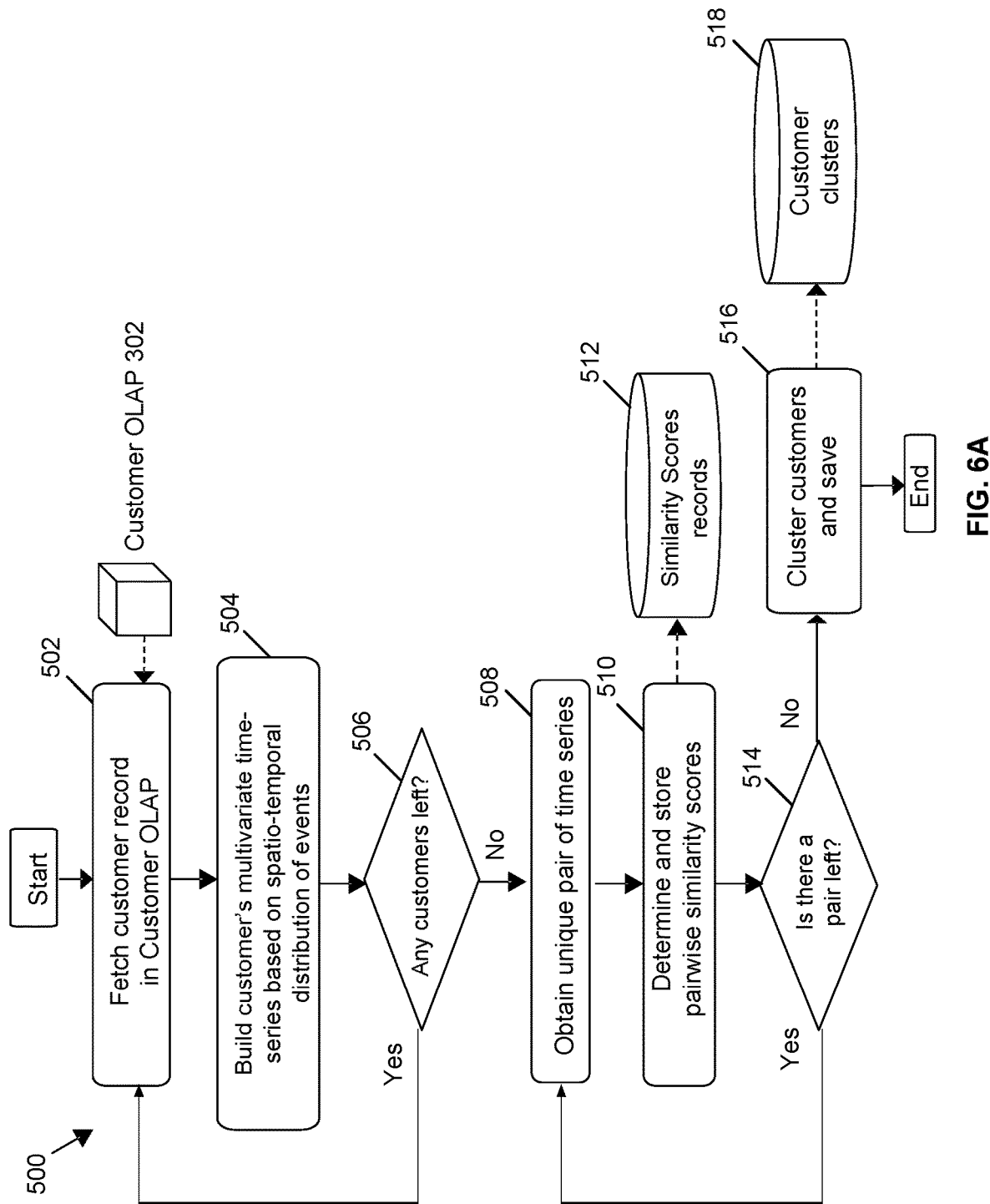
FIG. 6A is a flowchart diagram of an example embodiment of a method for clustering customers.

Referring to FIG. 6A, shown therein is an example embodiment of a method 500 for grouping similar customers in a customer cluster. The method 500 can be performed by the processing unit 102 of the server 100. The notion of similarity is based on, but not limited to, a spatio-temporal distribution of certain events which may be represented as a multivariate time-series. An event is the occurrence of an incident involving the electronic device where the electronic device may be damaged such as due to a drop or a scratch and an electronic claim for damage reimbursement may or may not have been made. At act 502, a customer's record is fetched from the Customer OLAP data cube 302. At act 504, the customer's multivariate time-series is generated based on a spatio-temporal distribution of events for the customer. For example, at each time interval, a customer's data record forms a vector of values (i.e. variables/attributes), e.g., a number of events, a number of electronic claims, etc. Stacking these vectors with respect to various time intervals builds a multivariate time-series. If only one variable is considered, e.g., the number of drop, then a univariate time-series can be generated which indicates the drop pattern for the customer within over time (it should be noted that the other multivariate and univariate time series described herein can be generated in the same fashion depending on the relevant variables). At act 506, the method 500 determines whether there are any other customer records to process. If the determination at act 506 is true then the method 500 proceeds to act 502. If the determination at act 506 is false then the method 500 proceeds to act 508.

At act 508, a unique pair of time-series data is obtained from the various multivariate time-series data generated at act 504. At act 510, a pairwise inter-customer similarity is determined on the pair of time-series data. This may be done using multivariate time-series similarity metrics such as those employed in identifying temporal (diachronic) topic-based communities [1], by employing the neural embedding technique suggested in [2] or by employing the vector cosine similarity metric. Once the similarity score is determined for the current pair of time-series data, the similar score is stored at act 512. The method 500 then proceeds to act 514 where it is determined whether there is another unique pair of time-series data. If the determination at act 514 is true, the method 500 proceeds to act 508. If the determination at act 514 is false, the method 500 proceeds to act 516 where customer clustering is performed. During customer clustering, the customers who have similar spatio-temporal events patterns, as represented by their time series data, are grouped as a cluster. Various techniques can be used to detect clusters such as, but not limited to, overlapping clustering algorithms like the Gaussian Mixture Model [3] or non-overlapping clustering methods like the k-means method [4] or the Louvain method [5] may be utilized.

Figure 6B:
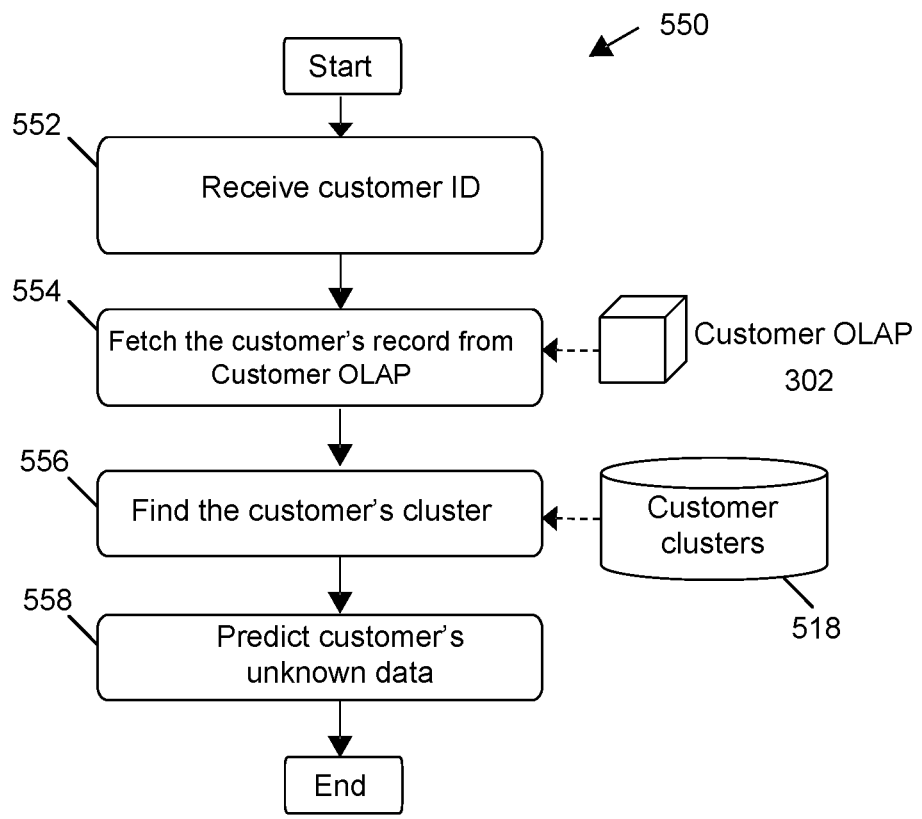
FIG. 6B is a flowchart diagram of an example for predicting unknown risk profile data for new customers or updating risk profile data for existing customers.

Referring now to FIG. 6B, shown therein is a method 550 for predicting unknown data about a given customer using the customer cluster generated by method 500. The method 550 can be performed by the processing unit 102 of the server 100. The unknown and/or yet-to-be-observed data (such as demographics (i.e. age, sex) and/or an estimate of risk level) of a given customer is based on the known data of other customers who share the same community (i.e. cluster) as the given customer. For instance, the method 500 may be able to predict the time (i.e. the date that the customer submits an electronic claim) and cost of an upcoming electronic claim for the given customer before the corresponding event actually occurs.

The method 550 starts at act 552 where a customer ID is received for a given customer for whom data is to be predicted. At act 554, the customer's data record is retrieved from the customer OLAP data cube 302. At act 556, a customer cluster from the customer cluster data 518 is determined for the given customer. This may be determined based on the similarity between the data of a new cluster and the centroid of each cluster based on a given threshold. The similarity of a given new customer and the centroids of all clusters determines to which cluster the new customer belongs. The similarity can be determined using the same similarity measure used by the clustering method in order to group similar customers. At act 558, the customer's unknown data is predicted. For example, the unknown data of a new customer may be estimated by the value of the cluster's centroid to which the new customer has been grouped. For instance, if the gender is not known, and the centroid of the clusters indicates "male", then it can be predicted that the new customer is "male".

The predicted data generated by the method 550 may be used for forward planning. For example, warrantors can predict the future churn of their customers using method 550, and the warrantors can then give the customers who are predicted to most likely not renew their warranty some promotions to reduce the customer churn rate. In another example, the predicted data generated by the method 550 may be used for determining which electronic ads can be sent to certain customers. For instance, if the new customer is "male", then electronic ads for males can be sent to the new customer.

Figure 7:
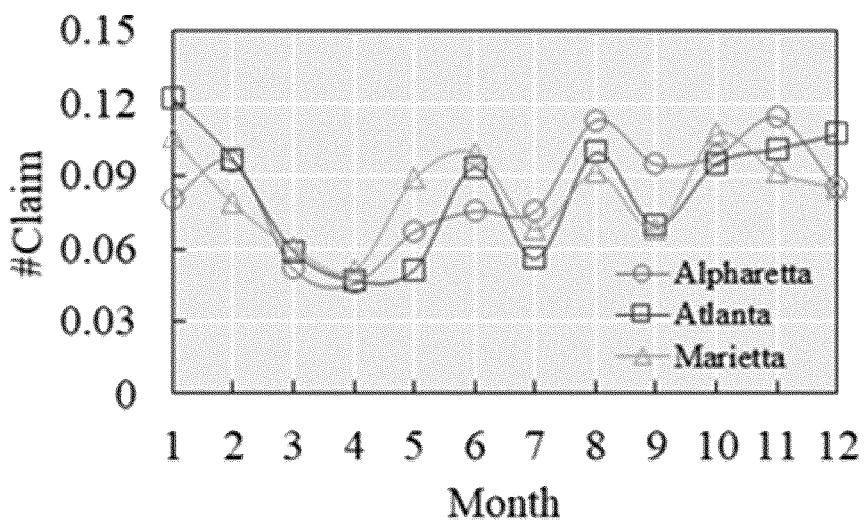
FIG. 7 is a diagram showing an example of a normalized electronic claims distribution over monthly time intervals for two example US cities where the number of electronic claims are normalized by the number of customers for each city.

The inventors have determined that customer claim data is biased toward location (e.g. spatial) and time (e.g. temporal) data, as shown in FIG. 7 where the number of electronic claims are normalized by the number of customers for three sample US cities and is rendered at each monthly time interval. As seen, there is a growing temporal trend towards the end of the year for the incoming electronic claims followed by a decline in the beginning of the next year for all sample cities. Also, different cities show a different distribution of electronic claims per month. As seen, while 'Marietta' is a high risk city in May and a low risk city in December, 'Atlanta' shows the opposite behaviour, i.e., Atlanta is a low risk city in May and a high risk city in December.

In another aspect, in accordance with the teachings herein, there is at least one embodiment that can indicate high risk vs. low risk profiles for certain locations within a given time period (such as within a given year) by building a geographical and temporal distribution of events that end with an electronic claim. For example, this data may be used to create a geo-temporal OLAP data cube. As an example, big cities where streets and sidewalks are made of a hard surface (e.g., cement or asphalt) show a higher incidence of device-damaging events and/or a greater severity of damage on average which may result in a higher number of electronic claims and associated warranty coverage cost and, hence, higher a number of electronic claims during a specific period of the year compared to the countryside for the same period of time. These analytics not only help warranty service providers to adjust their policies and prices based on locations (e.g., regions, cities, or countries) and time of the year, but may also be used to provide an electronic notification to customers who move from a low risk region to a high risk region.

Referring now to FIG. 8, shown therein is a method 600 for indicating high risk vs. low risk profiles for certain geographical locations within a given time period. The method 600 can be performed by the processing unit 102 of the server 100. At act 602, the method 600 retrieves electronic claims from the Customer OLAP data cube 302 and creates a map for each time interval. The map may be a two dimensional topographic map which may be created by providing the retrieved data to a mapping tool. Next, at act 604, the method 600 fetches record data for an electronic claim. At act 606, the method 600 then finds the geographical coordinates corresponding to the location of the electronic claim, called a geocode, which comprises latitude and longitude, which might be obtained using a map API such as Google Maps. At act 608, the method 600 then determines the time interval of the electronic claim (i.e. timestamp of when the electronic claim was filed). At act 610, the method 600 renders the electronic claim's geocode in a geographic map for the corresponding time period (e.g., in a certain month, etc.) and highlights high (or low) risk regions in each time interval. At act 612, it is then determined whether there are additional electronic records to process. If the determination at act 612 is true, the method 600 proceeds to act 604. Otherwise, if the determination at act 612 is false, the method 600 ends. The end result is one or more maps showing a geographic distribution electronic claims for corresponding time intervals.

In at least one embodiment in accordance with the teachings herein, methods 700 and 750 may be performed for providing warranty policy and price baselines for each time interval of the year for customers of a newly unseen region (i.e. a geographic region from which no customers have previously subscribed to using the server 100), as shown in FIGS. 9 and 10. The methods 700 and 750 may be performed by the processing unit 102 of the server 100.

Referring now to FIG. 9, at act 702 the method 700 selects a known geographic location and fetches data about the selected geographical region at act 704 from the geography dimension of the multidimensional data structure 200. At act 706, the method 700 determines whether there are any other geographical regions from which data should be collected. If the determination at act 706 is true, the method 700 proceeds to act 702. Otherwise if the determination at act 706 is false, the method 700 proceeds to act 708 where the method 700 obtains data for a unique pair of regions. This data may be converted into a multivariate time series by adding related data from the time dimension. Then, at act 710 the method 700 determines the pairwise similarities of the regions based on a regions' data (e.g., population, cost of living, etc.) and stores the results in pairwise similarity score records 712. The pairwise similarity may be determined using appropriate methods such as those discussed in [1] or [2] or by employing the vector cosine similarity metric. At act 714, the method 700 determines whether there are any data for unique pairs of regions. If the determination at act 714 is true, the method 700 proceeds to act 708. Otherwise if the determination at act 714 is false, the method 700 proceeds to act 718 where the method 700 groups similar regions into cluster regions based on the similarity of the region data based on the similarity score records and stores the region clusters 720 in the region clusters data 313. Accordingly, the region cluster data 313 includes data about the attributes or variables for the centroids of each different cluster and the membership of each cluster. The clustering at act 718 may be performed using overlapping clustering algorithms such as, but not limited to, the Gaussian Mixture model [3] or by using non-overlapping clustering methods such as, but not limited to, the k-means method [4] or the Louvain method [5].

Referring now to FIG. 10, in another aspect, the method 750 may be used to find the closest region cluster for the newly unseen region, which may be done using a similarity measure, in order to determine a warranty and pricing policy baseline that may be recommended for warrantors for the newly unseen geographical region based on known geographical regions in the same cluster region. At act 752, the method 700 receives an ID for a new region to provide data analytics for. At act 754, the method fetches data about the new geographical region where this data may include the geographical location, the population, the cost of living and the like. At act 756, the method 700 finds a cluster region that corresponds to the new geographical region using the region cluster data 720 determined by the method 700. This may be done by determining the similarity of data about a new region and the existing clusters' centroids. A centroid for a cluster is a member which best represents the overall properties/characteristics of the cluster. At act 756, the method 700 determines and offers a policy baseline. The policy baseline may be provided to warrantors 140 who want to generate a warranty policy for a new region, such as a city for example, which may initially be set to be the same as a warranty plan and price for an already covered city that has similar characteristics of the new region. In other words if the metrics for a new region lie within a cluster region X, then the centroid of the cluster region X will have a policy which is representative of the warranty policies of all cities with the cluster region X. The warranty policy for the centroid of cluster region X can then be selected as the baseline policy for the new region. Without these analytics, warrantors will have to start determining a warranty policy for a new region from scratch or will have to look to the warranty policies of rival companies. However, with these analytics, the warrantor can start with a policy which has already been deployed successfully for a similar city and become the best practice for that city.

Regarding the protective apparatus OLAP data cube 304, at least one embodiment in accordance with the teachings herein can be used to perform various functions using data cube 304 including, but not limited to, determining a spatio-temporal correlation between device-damaging events while each protective apparatus is applied and respective electronic claims which enables the server 100 to: i) indicate high risk vs. low risk protection (for example, by employing method 800 shown in FIG. 11), ii) provide electronic feedback to manufacturers in order to improve the quality of the protective apparatus, and iii) provide protective apparatus recommendation to customers. For example, based on data that is obtained about how the electronic device is being used by the customers when and event and/or electronic claim occur, statistics can be generated to show which functional and/or structural aspects of the electronic device are more likely to occur in an event having damage to the electronic device. These analytics can be performed with corresponding statistical analysis to determine whether the functional and/or structural aspects of the electronic device are statistically significant in contributing to damage during events. A corresponding electronic report can then be generated and electronically sent to the device manufacturer who can then identify and redesign the structural and/or functional aspect of the device which was found to statistically lead to more events where the electronic device is damaged in order to improve the safety of the electronic device.

In at least one embodiment described herein, a given protective apparatus may be correlated with a spatio-temporal distribution of a customer's electronic claims obtained from the claims distribution data 314 and to obtain the respective instances of when a device-damaging event occurred while the protective apparatus is applied to an electronic device. One example aspect of this embodiment is to indicate high risk vs. low risk protection based on the spatio-temporal distribution of device-damaging events as well as events specification and claim cost. A protective apparatus (e.g., a protective case) is said to be a low risk protective apparatus for an electronic device (e.g., a smartphone) when there are no electronic claims, when there are very few high-cost electronic claims, or when there are several low-cost electronic claims for drop events from a certain height (e.g., 1 meter) on a certain type of surface (e.g., a hard surface) during a long period of time (e.g., one year) in most and/or all geographical regions. Accordingly, high (low) risk protective apparatuses can be identified for certain time intervals (e.g., for school semesters, months, weeks, certain days of the week, weekends, quarters and the like) per different geographical regions (e.g., cities, towns, provinces, countries and the like).

In at least one embodiment described herein, the electronic claims including the damage specification and severity may be correlated with the respective event while a protective apparatus was applied to the electronic device. The correlation can be utilized to generate feedback reports for protective apparatus manufacturers about how often events cause damage to an electronic device that uses the protective apparatus. The feedback report can be provided by the feedback module 328 and includes details about the events such as, but not limited to, the height of a device drop and data about the damage to the electronic device such as the severity of damage (this may be defined according to a predetermined range such as low, medium and high) and/or repair cost. For instance, at least one embodiment described herein may provide a feedback report to a manufacturer on its protective cases where the report indicates that the manufacturer's protective case are able to protect electronic devices from device drop events at a height of 1 meter when one of the electronic device's edges hit the surface but the protective case face cannot protect electronic devices from device drops at a height of 1 meter when the electronic device's front face hits the surface. This feedback report may be generated for each protective apparatus for which the manufacturer is interested in receiving performance feedback. The manufacturer may then use the data in the feedback report to redesign certain aspects of the protective apparatus to improve its performance.

In at least one embodiment described herein, referring back to the method 500 for performing customer clustering (see FIG. 6A), high risk vs. low risk protective apparatuses can be identified per customer clusters, i.e., for each customer cluster. This may be done by correlating data about the protective apparatuses with the spatio-temporal distribution of electronic claims in the claims distribution data 314 to find instances of device-damaging events when the protective apparatus is applied on the electronic devices for cluster members 518. As such, a recommender system used by the recommendation module 326 may be trained in order to recommend low risk protective apparatuses for a given customer cluster to customers who are similar to customers in the given customer cluster (which may be based on using one of the similarity metrics described herein). For instance, in such embodiments the recommendation module 326 may recommend a given protective case from a specific manufacturer to customers whose main activity is above the earth's surface (e.g., mountain climbers or construction workers) since the given protective case has been identified to be low risk for a customer cluster whose members' average height of drop events is at least 10 meters, i.e., although there are many drops of a height of at least 10 meters for members of this customer cluster, there are few high-cost electronic claims, several low-cost electronic claims or no electronic claims have been filed.

In at least one embodiment described herein, an advertising selector is provided to present personalized or targeted advertisements/offers (e.g., a coupon) about protective apparatuses on behalf of manufacturers or retailers based on data from the protective apparatus OLAP 304. Referring back to the method 500 for generating customer clusters (see FIG. 6A), the protective apparatus OLAP 304 can use the customer clusters 518 to perform at least one of selecting, identifying, generating, adjusting, prioritizing, and personalizing advertisements/offers to the customers. For example, in at least one embodiment, the customers' response to mobile ads such as the click-through rate (i.e., the ratio of customers who click on a specific ad to the number of total customers who are presented the specific ad), the lingering time (i.e., the amount of time a customer spends viewing the specific ad), and the purchase rate (e.g. as described in US20090216579A1 or obtained using other techniques) may further be collected to determine the success of the specified ads and/or enhance the customer clusters 518. It is worth noting that targeted advertisement and protective apparatus recommendations are examples of two different types of recommendations that can be included in the same or separate electronic messages that may be sent to a user of the server 100. In targeted advertisement, the advertising selector finds the correct target customers given the specific ads and how they are viewed by customers which may be about any products. In contrast, the recommendation module 326 may recommend an appropriate protective apparatus other given data about the customer such as demographics, location, education and the like.

Regarding the electronic devices OLAP data cube 306, at least one embodiment described herein can perform various analytics on the data from cube 306 such as, but not limited to, at least one of: i) determining a spatio-temporal electronic device risk profile 318 for each electronic device which can be used to determine whether a particular electronic device is susceptible to damage, and ii) perform usability testing for each electronic device to determine electronic device usability test 320 to provide feedback via the feedback module 328 to electronic device manufacturers.

For example, in at least one embodiment, each electronic device may be correlated with a spatio-temporal distribution of events (from the events database) and a separate spatio-temporal distribution of electronic claims (from the claims database) to obtain correlation data. The correlation data may then be utilized to indicate whether a given electronic device is a high risk or a low risk device. This data can then be added to the electronic device risk profile 318. For example, an electronic device (e.g., iPhone 6S) may be classified as a low risk device if there are no electronic claims, very few high-cost electronic claims, or several low-cost electronic claims for drop events at a certain height (e.g., 1 meter) on a certain type of surface (e.g., hard surface) during a certain period of time (e.g., year) in most and/or geographical regions while no protective apparatus is applied. Otherwise, the electronic device may be classified as being a high risk device. A high (low) risk electronic device can be identified for different time intervals (e.g., for each semester, every quarter, every 6 months or every year) and/or for different geographical regions (e.g., cities, towns, provinces, or countries).

In another aspect, in at least one embodiment described herein, the causal dependencies between electronic devices and protective apparatuses may be identified in order to indicate whether applying a protective apparatus on an electronic device has an impact on the risk level of the electronic device. In accordance with the teachings herein, an electronic device has been found to be causally dependent on a protective apparatus if applying the protective apparatus changes the risk profile of the electronic device from high risk to low risk. For example, the Granger concept of causality (i.e. G-causality) [6] can be used to identify the causal dependencies between electronic devices and protective apparatuses.

In at least one embodiment described herein, usability testing of an electronic device may be correlated with various events in order to generate the Electronic Device Usability test 322. Usability testing is a way to measure how convenient it is to use an electronic device from a customer's perspective. An electronic device may be classified or identified as being usable if there are no or very few events (e.g., device drop or device scratches), i.e. as compared to a threshold, during a certain period of time (e.g., one year) while a different functionality of the electronic device was being used by the customer during the time period. Examples of functionality include, but are not limited to, lowering the ring sound by pressing the volume up button, for example. The usability testing can be done for a set of desired functions for each electronic device, e.g., per user interaction with different buttons: home, volume up, volume down, or side buttons. The UI features that the customer is interacting with may be captured at the time of a drop or other damaging event and sent to the server 100 for the purpose of usability testing. The embodiment is able to notify customers and/or manufacturers about the usability of their electronic devices.

For instance, when a customer is using an electronic device, based on the risk profile of the electronic device, the notification module 330 of the server 100 sends the customer a warning notification that using the electronic device and/or one or more particular functionalities of the electronic device may increase the probability a damaging event, e.g., a drop, occurring. The electronic notification allows the customer to take precautionary steps, e.g., using two hands to hold the electronic device.

In another instance, manufacturers can access the server 100 to access the risk profile of their electronic devices. If one of their electronic devices is labeled as being high risk, the electronic device manufacturer can figure out which part of the electronic device and/or what functionality of the electronic device increases the probability that a damaging event occurs. For instance, an electronic device might be labeled high risk because it is hard for the customer to activate a functionality of the electronic device (e.g., increasing volume up/down) by using only one of their hands and so, a damaging event such as a drop may follow according to correlation study between the electronic device and the events data where the correlation study is performed by the analytical applications of the server 100. The electronic device manufacturer, then, can redesign the electronic device and interact with the server to perform further analytics to see whether the change makes the electronic device more easy to (i.e. more useable) and lowers the risk of the electronic device, i.e., customers are able to interact with the electronic device more easily and the probability of a damaging event occurring while using the device becomes significantly lower.

As another example, in at least one embodiment described herein, the top N, where N is an integer such as 1, 2, 5 or 10 for example, most recent functionalities of an electronic device which have been used by a customer immediately before an event occurs (i.e. device drop, device hit, device scratch) are recorded automatically in order to enable electronic device usability testing.

Regarding the software app OLAP data cube 308, at least one embodiment described herein can be used to provide various functions such as, but not limited to, generating software App Risk Profile data 322 for one or more selected software apps which can be used to indicate whether a customer who interacts with one of the selected software apps increases the probability that a damaging event such as device drop will occur and therefore indicates whether the software app is a high risk vs. low risk software app, and performing a usability test for the one or more selected software apps to obtain Software App Usability test 324 which provides feedback to mobile app developers in order to improve the usability of their apps. For example, the usability of different software apps may be evaluated by tracking the software application that the customer is interacting with when her electronic device is dropped.

For example, in at least one embodiment, the usability testing of a software app may be correlated with event data. Usability testing is a way to measure how convenient it is to use a software app from a customer's perspective. The most recent interactions that a customer has had with a software app immediately before a drop or other damaging event is recorded automatically (e.g., by tools provided by www.appsee.com) in order to enable mobile app usability testing. Interaction with a software app includes, but is not limited to, a user tapping, double tapping, dragging, flicking, pinching, spreading, pressing, rotating, their fingers or performing any combination of these movements on parts of a software app UI. A software app may be classified as being usable and therefore low risk if there are no or very few events (e.g., device drop, device scratch, and device hit) during a certain period of time (e.g., one year) while the software app has been used by one or more customers. Each software app and event may be considered as two variables and correlation studies (e.g., using the Pearson coefficient, for example) and/or causal studies can be employed to determine if there is a correlation or a cause-effect relationship between the software app on the one hand and the event on the other hand. For instance, a strong causal relationship between a software app and an event implies that using the software app leads to an event.

Accordingly, in at least one embodiment, the notification module 330 may be used to provide electronic messages, through various messaging applications over a network, to customers and/or software app developers to notify these user groups about the usability of these software apps. When the customer opens a software app, based on the risk profile of the software app, the notification module 330 electronically sends the customer an electronic warning notification about interacting with the software app may increase the probability that a damaging event, e.g., a drop, will occur so that the customer take precautionary steps, e.g., change her standing posture to sitting or using two hands to hold the electronic device to reduce the chance that a damaging event will occur.

In another aspect, software app developers may access the server 100 to access the risk profile of their software apps. If a given software app is labeled high risk, the software app developer can figure out which part of the software app and/or what interaction with the software app increase the probability that a damaging event will occur. For instance, the given software app might be labeled as being high risk because it is hard for the customer to reach part of the UI of the software app by using only one hand and if they do use only one hand, a damaging drop follows according to a correlation study between the software app and events. The software app developer, then, can redesign the software app and determine whether the change in the software app has resulted in fewer electronic claims because the design change makes the software app more useable and it becomes a low risk app, i.e., customers are able to interact with the software app more easily and the probability of a damaging event while using the software app becomes significantly lower.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

[1] H. Fani, E. Bagheri, F. Zarrinkalam, X. Zhao, W. Du, "Finding Diachronic Like-Minded Users", Computational Intelligence, Volume 34, Issue 1, Apr. 28, 2017, pp. 124-144.
[2] H. Fani, E. Bagheri, W. Du, "Temporally Like-minded User Community Identification through Neural Embeddings", Proceedings of the 2017 ACM on Conference on Information and Knowledge Management, pp. 577-586.
[3] Wikipedia webpage on the Gaussian Mixture Model (https://en.wikipedia.org/wiki/Mixture_model), accessed on May 28, 2019.
[4] E. Forgy, "Cluster analysis of multivariate data: efficiency versus interpretability of classifications", *Biometrics* 21 (1965): pp. 768-780.
[5] V. D. Blondel, J. L. Guillaume, R. Lambiotte and E. Lefebvre, "Fast unfolding of communities in large networks", Journal of Statistical Mechanics: Theory and Experiment, Vol. 2008, Oct. 9, 2008, pp. 1-12.
[6] C. Grander, "Investigating Causal Relations by Econometric Models and Cross-Spectral Methods", Econometrica, 1969, vol. 37, Issue 3, pp. 424-438.

The invention claimed is:

1. A computer implemented method for providing actionable insights based on warranty analytics related to usage of a protective apparatus with an electronic device by a customer, wherein the method comprises:
   collecting, at a server, customer data, warranty data, electronic device data, and protective apparatus data, wherein:
      the customer data comprises demographic data about customers; and
      the warranty data comprises a coverage period, warranty terms, warranty conditions, warrantor name, and/or warrantor address;
   collecting, via sensors within the electronic device, event data including sensor data measuring a height and angle of movements of the electronic device;
   collecting, at the server, time data comprising occurrence time of the movements;
   storing, at the server, the customer data, warranty data, electronic device data, protective apparatus data, event data, and time data through multiple dimensions of a multidimensional data structure;
   applying, at the server, Online Analytical Processing (OLAP) to the multidimensional structure to generate customer OLAP data cubes that include at least a subset of the multiple dimensions of the multidimensional data structure;
   fetching customer records for multiple customers from the customer OLAP data cubes, wherein the customer records comprise said customer data, warranty data, protective apparatus data, electronic device data, event data, and time data;
   building a training dataset through a multivariate time-series for each of the multiple customers using data from the fetched customer records, wherein the multivariate time-series is based on a spatio-temporal distribution of events for the customer, the spatio-temporal distribution of events comprising at least: the event data and the time data;
   determining risk classifications associated with one or more of the multiple customers using data from the fetched customer records, wherein the risk classifications correspond to a range of scores from high risk to low risk;
   augmenting the training dataset to include the determined risk classifications;
   training, using the augmented training dataset, a machine learning classifier, wherein the augmented training set comprises the fetched customer records associated with the multivariate time-series;
   applying the trained machine learning classifier to the fetched customer records to classify the fetched customer records according to risk level;
   receiving an electronic query, at the server, from a user device, the electronic query being related to device damage risk associated with usage of the protective apparatus with the electronic device by a given customer for a given location within a given time period;
   generating, by a recommendation module at the server, a recommendation in response to the electronic query by providing query data about the given customer to the trained machine learning classifier; and
   sending an electronic message from the server to the user device, the electronic message including the generated recommendation.

2. The method of claim 1, wherein the method further comprises accessing, from the multidimensional data structure, data needed to respond to the electronic query, wherein the accessed data comprises any combination of customer risk profile data, customer cluster data, electronic claims distribution data, protective apparatus risk profile data, electronic device risk profile data, and software app risk profile data.

3. The method of claim 2, wherein the accessed data further comprises any combination of electronic device usability test data and software app usability test data.

4. The method of claim 3, wherein the method comprises generating, at the server, electronic feedback based on any combination of the protective apparatus risk profile data, the electronic device usability data and the software app usability data and sending the electronic feedback in the electronic message to the user device, wherein the electronic feedback includes data on which protective apparatuses, electronic devices, and/or software apps are low-risk or high-risk for risk of damage.

5. The method of claim 3, wherein the method comprises generating, at the server, an electronic recommendation based on the electronic claims distribution data and the protective apparatus risk profile and sending the electronic recommendation in the electronic message to the user device, wherein the electronic recommendation includes a personalized recommendation of a particular protective apparatus for the customer and/or a warranty plan.

6. The method of claim 1, wherein the method further comprises storing software app data and geography data along different dimensions of the multidimensional data structure and storing the multidimensional data structure, and the electronic claims data in a data store.

7. The method of claim 6, wherein the customer OLAP data cube includes customer risk profile data, customer cluster data and/or electronic claim distribution data.

8. The method of claim 6, wherein the method comprises applying Online Analytical Processing (OLAP) to the multidimensional structure to generate a protective apparatus OLAP data cube that includes protective apparatus risk profile data.

9. The method of claim 6, wherein the method comprises applying Online Analytical Processing (OLAP) to the multidimensional structure to generate an electronic device OLAP data cube that includes electronic device risk profile data and data related to electronic device usability testing.

10. The method of claim 6, wherein the method comprises applying Online Analytical Processing (OLAP) to the multidimensional structure to generate a software app OLAP data cube that includes software app risk profile data and data related to software app usability testing.

11. The method of claim 1, wherein determining risk classifications associated with one or more of the multiple customers comprises:
for a given customer of the one or more of the multiple customers:
fetching a customer record from the customer OLAP data cube for retrieving the given customer's claim history;
determining from the claim history whether a high risk label or a low risk label applies to the given customer; and
updating the customer record for the given customer with the determined risk label;
augmenting the training dataset comprises generating training samples using the determined labels; and
the method further comprises storing the trained machine learning classifier in a data store.

12. The method of claim 7, wherein the method comprises determining a given customer's risk profile, at the server, by:
receiving a customer ID;
fetching a customer record from the customer OLAP data cube using the customer ID;
predicting the customer risk profile for the given customer by applying a customer classifier to one or more data attributes from the customer record of the given customer; and
storing the predicted customer risk profile in the customer record for the given customer.

13. The method of claim 7, wherein the method comprises determining customer clusters, at the server, by:
obtaining a unique pair of the multivariate time-series;
determining a pairwise similarity score from the unique pair of multivariate time-series;
storing the determined pairwise similarity score;
repeating the obtaining, determining and storing for each unique pair of multivariate time-series; and
generating the customer clusters from the stored pairwise similarity scores.

14. The method of claim 7, wherein the method comprises predicting data for a given customer, at the server, by:
receiving a customer ID;
fetching a customer record from the customer OLAP data cube using the customer ID;
locating a customer cluster that corresponds to the given customer; and
generating the predicted data for the given customer using data attributes from a centroid of the located customer cluster.

15. The method of claim 7, wherein the method comprises showing high risk vs. low risk profiles for certain geographical locations within a given time period, at the server, by:
for customers in the customer OLAP data cube:
creating geographic maps for several time periods using data from the customer OLAP data cube;
fetching an electronic claim from the electronic claims data in the data store;
determining a geocode and a time period for the electronic claim;
finding one of the geographic maps for the time period of the electronic claim; and
rendering the geocode for the electronic claim in the found geographic map to highlight high or low risk regions for the several time periods.

16. The method of claim 6, wherein the method comprises generating region clusters for electronic claims, at the server, by:
selecting a geographic region;
fetching data about the geographic region from the data store;
repeating the selecting and fetching for all geographic regions for which data is stored in the data store;
obtaining data for a unique pair of geographic regions;
determining a pairwise similarity score for the unique pair of geographic regions;
storing the pairwise similarity score in the data store;
repeating the obtaining, determining and storing for each unique pair of geographic regions; and
generating the region clusters from the stored pairwise similarity scores.

17. The method of claim 6, wherein the method comprises determining a warranty and pricing policy baseline for newly unseen geographic regions based on known geographic regions, at the server, by:

receiving an ID for a new geographic region;
fetching data about the new geographic region;
locating a region cluster that corresponds to the new geographic region using the fetched data and data from centroids of the cluster regions; and
determining the warranty and pricing policy baseline using data from a centroid of the located region cluster.

18. The method according to claim 9, wherein the method comprises:
retrieving the electronic device risk profile data and data related to electronic device usability testing for a given electronic device;
determining a number of events involving the given electronic device during a certain period of time;
determining UI features of the device that were used when the events occurred;
classifying the given electronic device as being high-risk or low risk during use; and
generating the electronic report including the UI features that were used during the events and the risk classification of the given electronic device.

19. The method according to claim 9, wherein the method comprises:
retrieving the electronic device risk profile for a given electronic device; and
sending the electronic notification to the customer with a warning that using the given electronic device and/or one or more particular functionalities of the electronic device increases the probability of a damaging event occurring.

20. The method according to claim 10, wherein the method comprises:
retrieving the software app risk profile data and data related to software app usability testing;
determining recent interactions that a customer has with a given software app immediately before an event; and
generating the electronic report including the recent interactions with the given software app and the software app risk profile data for the given software app.

21. The method according to claim 10, wherein the method comprises:
retrieving the software app risk profile for a given software app; and
sending the electronic notification to the customer with a warning that using the given software app increases the probability of a damaging event occurring.

22. The method of claim 6, wherein the customer OLAP data cube includes customer risk profile data, customer cluster data and electronic claim distribution data and the method further comprises:
applying OLAP to the multidimensional structure to generate a protective apparatus OLAP data cube that includes protective apparatus risk profile data;
applying OLAP to the multidimensional structure to generate an electronic device OLAP data cube that includes electronic device risk profile data and data related to electronic device usability testing; and/or
applying OLAP to the multidimensional structure to generate a software app OLAP data cube that includes software app risk profile data and data related to software app usability testing.

23. The method of claim 12, wherein the method comprises using the customer classifier to predict the customer risk profile to classify the customer as belonging to a high risk or low risk class and determining policy and price adjustments for a new customer or an existing customer based on the predicted customer risk profile.

24. The method of claim 2, wherein when the customer is a high risk customer the method comprises providing an actionable recommendation to the customer including purchasing a high-quality protective apparatus.

25. The method of claim 15, wherein the method comprises using the predicted data for the given customer using data attributes from a centroid of the located customer cluster for determining electronic ads to send to the given customer.

26. A system for providing actionable insights based on warranty analytics related to usage of a protective apparatus with an electronic device by a customer, wherein the system comprises:
a server comprising:
a communication unit for electronically communicating with at least one user device;
a data store that is configured to store program instructions for performing warranty analytics, and data comprising a multidimensional data structure and operational data, wherein the data includes customer data, warranty data, protective apparatus data, electronic device data, event data and time data stored along different dimensions of the multidimensional data structure, wherein:
the customer data comprises demographic data about customers;
the warranty data comprises a coverage period, warranty terms, warranty conditions, warrantor name, and/or warrantor address;
the event data includes sensor data measuring a height and angle of movements of the electronic device, wherein the event data including the sensor data is collected via sensors within the electronic device; and
the time data comprises occurrence time of the movements;
a processing unit that is operatively coupled to the communication unit and the data store, the processing unit having at least one processor that is configured to:
apply Online Analytical Processing (OLAP) to the multidimensional structure to generate customer OLAP data cubes that include at least a subset of the multiple dimensions of the multidimensional data structure;
fetch customer records for multiple customers from the customer OLAP data cubes, wherein the customer records comprise said customer data, warranty data, protective apparatus data, electronic device data, event data, and time data;
build a training dataset through a multivariate time-series for each of the multiple customers using data from the fetched customer records, wherein the multivariate time-series is based on a spatio-temporal distribution of events for the customer, the spatio-temporal distribution of events comprising at least: the event data and the time data;
determine risk classifications associated with one or more of the multiple customers using data from the fetched customer records, wherein the risk classifications correspond to a range of scores from high risk to low risk;
augment the training dataset to include the determined risk classifications;
train, using the augmented training dataset, a machine learning classifier, wherein the augmented training set comprises the fetched customer records associated with the multivariate time-series;

apply the trained machine learning classifier to the fetched customer records to classify the fetched customer records according to risk level;

receive an electronic query from the at least one user device, the electronic query being related to device damage risk associated with usage of the protective apparatus with the electronic device by a given customer for a given location within a given time period;

generate a recommendation in response to the electronic query by providing query data about the given customer to the trained machine learning classifier; and send an electronic message to the at least one user device, the electronic message including the generated recommendation.

27. A non-transitory computer readable medium, comprising a plurality of instructions which, when executed on a processing unit, cause the processing unit to implement a method for providing actionable insights based on warranty analytics related to usage of a protective apparatus with an electronic device, wherein the method is defined according to claim 1.

* * * * *